US009826140B2

(12) United States Patent
Konishi et al.

(10) Patent No.: US 9,826,140 B2
(45) Date of Patent: Nov. 21, 2017

(54) IMAGE CAPTURING APPARATUS AND CONTROL METHOD THEREOF

(71) Applicant: CANON KABUSHIKI KAISHA, Tokyo (JP)

(72) Inventors: Kazuki Konishi, Tokyo (JP); Naoki Iwasaki, Kawasaki (JP); Akiko Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/487,740

(22) Filed: Sep. 16, 2014

(65) Prior Publication Data
US 2015/0163395 A1 Jun. 11, 2015

(30) Foreign Application Priority Data

Dec. 5, 2013 (JP) .................................. 2013-252415

(51) Int. Cl.
*H04N 5/232* (2006.01)
*H04N 5/353* (2011.01)
(Continued)

(52) U.S. Cl.
CPC ....... *H04N 5/23212* (2013.01); *H04N 5/2353* (2013.01); *H04N 5/2357* (2013.01);
(Continued)

(58) Field of Classification Search
CPC .. H04N 5/23212; H04N 5/235; H04N 5/2353; H04N 5/335–5/378; H04N 5/23293; G03B 13/36
See application file for complete search history.

(56) References Cited

U.S. PATENT DOCUMENTS

2006/0221192 A1 10/2006 Nakajima et al.
2008/0074534 A1 3/2008 Kusaka
(Continued)

FOREIGN PATENT DOCUMENTS

CN 101325657 A 12/2008
CN 101359150 A 2/2009
(Continued)

OTHER PUBLICATIONS

The above patent documents were cited in a U.S. Office Action dated Feb. 2, 2016, a copy of which is not enclosed, that issued in a related U.S. Appl. No. 14/495,187.
(Continued)

*Primary Examiner* — Paul Berardesca
(74) *Attorney, Agent, or Firm* — Cowan, Liebowitz & Latman, P.C.

(57) ABSTRACT

In an image capturing apparatus, an image sensing unit has a plurality of pixels and photoelectrically converts an object image formed by an optical imaging system including a focus lens and outputs an electrical image signal, a control unit controls at least a readout rate or an exposure condition independently for different regions of the image sensing unit, and a calculation unit calculates a plurality of focus evaluation values based on image signals read out from the pixels present in a focus detection area in one of the plurality of different regions at different focus lens positions, and find an in-focus position of the focus lens based on the focus evaluation values. The control unit takes an image signal read out from a first region among the plurality of different regions as an image signal for display.

8 Claims, 25 Drawing Sheets

(51) Int. Cl.
*H04N 5/235* (2006.01)
*H04N 5/369* (2011.01)

(52) U.S. Cl.
CPC ....... *H04N 5/23293* (2013.01); *H04N 5/3535* (2013.01); *H04N 5/3696* (2013.01)

(56) References Cited

U.S. PATENT DOCUMENTS

| | | | |
|---|---|---|---|
| 2008/0218611 A1 | 9/2008 | Parulski et al. | |
| 2008/0259202 A1* | 10/2008 | Fujii | H04N 5/23212 348/345 |
| 2008/0303925 A1 | 12/2008 | Oota | |
| 2009/0034954 A1 | 2/2009 | Kubota et al. | |
| 2010/0123818 A1 | 5/2010 | Ono | |
| 2011/0141329 A1 | 6/2011 | Nakagawa | |
| 2011/0149129 A1* | 6/2011 | Kim | H04N 5/2351 348/296 |
| 2012/0038810 A1 | 2/2012 | Taniguchi | |
| 2012/0120277 A1 | 5/2012 | Tsai | |
| 2012/0147227 A1 | 6/2012 | Yoshimura et al. | |
| 2012/0176505 A1 | 7/2012 | Kim et al. | |
| 2012/0194731 A1 | 8/2012 | Kimoto | |
| 2013/0113966 A1 | 5/2013 | Arishima et al. | |
| 2013/0300895 A1 | 11/2013 | Kawarada | |
| 2015/0229831 A1 | 8/2015 | Miyazawa | |
| 2015/0256778 A1 | 9/2015 | Kusaka | |

FOREIGN PATENT DOCUMENTS

| | | |
|---|---|---|
| CN | 102292974 A | 12/2011 |
| CN | 102547116 A | 7/2012 |
| CN | 102857700 A | 1/2013 |
| JP | 04-070632 A | 3/1992 |
| JP | 08-265631 A | 10/1996 |
| JP | 2620235 | 6/1997 |
| JP | 2000-078461 A | 3/2000 |
| JP | 3105334 B | 10/2000 |
| JP | 2001-021792 A | 1/2001 |
| JP | 2002-196220 A | 7/2002 |
| JP | 2004-101766 A | 4/2004 |
| JP | 2005-051282 A | 2/2005 |
| JP | 2006-184320 A | 7/2006 |
| JP | 2007-065048 A | 3/2007 |
| JP | 2007-072013 A | 3/2007 |
| JP | 2007-097033 JP | 4/2007 |
| JP | 2007-101907 | 4/2007 |
| JP | 2007-171807 A | 7/2007 |
| JP | 2007-212723 A | 8/2007 |
| JP | 2007-212745 | 8/2007 |
| JP | 2008-085535 A | 4/2008 |
| JP | 2008-130531 JP | 6/2008 |
| JP | 4185741 B | 11/2008 |
| JP | 2009-049858 A | 3/2009 |
| JP | 4235422 B | 3/2009 |
| JP | 2009-272813 A | 11/2009 |
| JP | 2010-181751 A | 8/2010 |
| JP | 2011-150281 A | 8/2011 |
| JP | 2012-113189 A | 6/2012 |
| JP | 2012-252280 A | 12/2012 |
| JP | 2013-042300 A | 2/2013 |
| JP | 2013-068819 A | 4/2013 |
| KR | 10-0643830 B1 | 11/2006 |

OTHER PUBLICATIONS

The above patent documents were cited in a Partial Search Report dated Oct. 29, 2014, a copy of which is enclosed, that issued in the corresponding European Patent Application No. 14182102.5, which is a counterpart application of the present application.
US Patent Application Publications 1-3 were cited in a related U.S. Appl. No. 14/493,374.
The above patent documents were cited in a European Search Report dated Mar. 27, 2015, a copy of which is enclosed, that issued in the corresponding European Patent Application No. 14182102.5, which is a counterpart application of a related application.
The above US reference was cited in a Russian office action issued on Oct. 10, 2016, a copy of which is enclosed ith an English Translation, that issued in Russian Patent Application No. 2014137669.
The above foreign patent documents were cited in a Apr. 19, 2017 Chinese Office Action, which is enclosed with an English Translation, that issued in Chinese Patent Application No. 201410478718.1.
The above foreign patent documents were cited in the Jun. 2, 2017 Japanese Office Action, which is not enclosed, that issued in Japanese Patent Application No. 2013202233.

* cited by examiner

FIG. 9

AF FRAMES

| FRAME 00 | FRAME 01 | FRAME 02 |
|----------|----------|----------|
| FRAME 10 | FRAME 11 | FRAME 12 |
| FRAME 20 | FRAME 21 | FRAME 22 |

F I G. 23
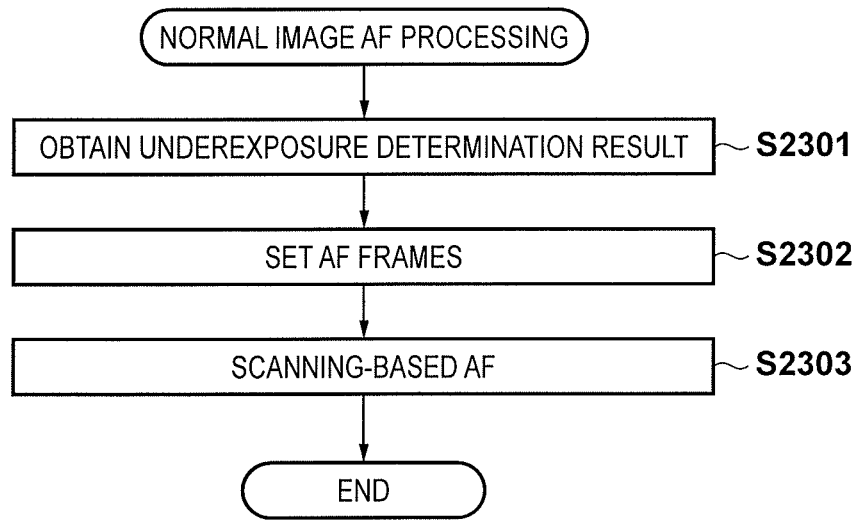

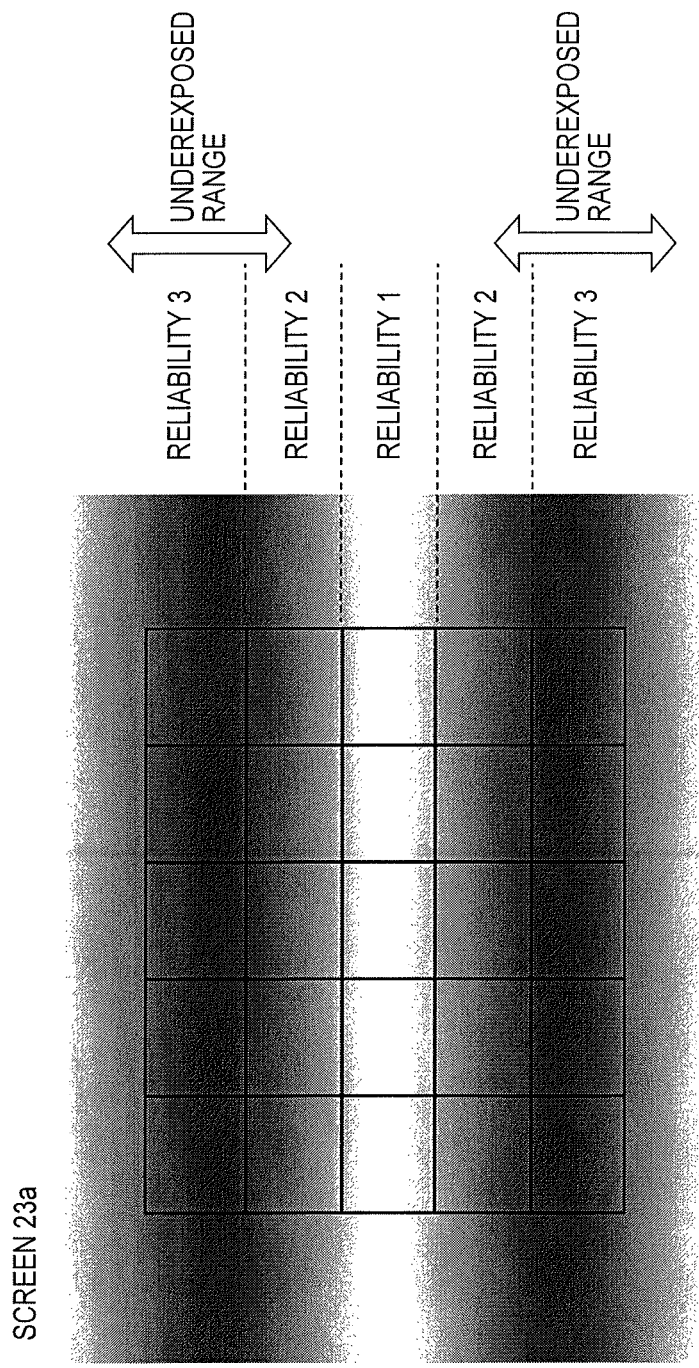

IMAGE CAPTURING APPARATUS AND CONTROL METHOD THEREOF

BACKGROUND OF THE INVENTION

Field of the Invention

The present invention relates to image capturing apparatuses and control methods thereof, and particularly relates to image capturing apparatuses that perform focus adjustment using an image signal obtained by an image sensor that photoelectrically converts an object image formed by an optical imaging system, and to control methods thereof.

Description of the Related Art

Conventionally, when a digital still camera, a video camera, or the like carries out autofocus (AF), a method is employed in which a focus lens position having maximum high-frequency components in a luminance signal obtained from an image sensor is taken as an in-focus position. A scanning method, described hereinafter, is known as one such method. In the scanning method, an evaluation value (called a "focus evaluation value" hereinafter) is found based on a high-frequency component of a luminance signal obtained from an image sensor while moving a focus lens across the entirety of a focus detection range, and is stored. At this time, a region for obtaining the focus evaluation value (called an "AF frame" hereinafter) is set in the vicinity of the center of the screen, in the vicinity of a region where an object has been detected, or the like, the focus lens position where the focus evaluation value is maximum in the set AF frame is obtained, and that focus lens position is set as the focus lens position to be used in the image capturing operation.

Meanwhile, a variety of automatic focus adjustment methods for high-luminance objects have been known for some time. In Japanese Patent No. 3105334, whether or not an object is a high-luminance object is determined based on the area of a low-luminance section or a mid-luminance section in an image signal of a frame to be shot. As a result of the determination, a contrast signal is used for focusing operations in the case where the object is a typical object, whereas the focusing operations are carried out so that the area of a high-luminance signal is reduced in the case where the object is a high-luminance object, making it possible to perform accurate focusing operations even on high-luminance objects.

Furthermore, a variety of automatic focus adjustment methods for cases where the object is a point light source are known. In Japanese Patent Laid-Open No. 2002-196220, an average brightness of the object is detected through AE processing, and in the case where the brightness is lower than the specified value, an AF search operation is carried out at an appropriate exposure level based on a result of the AE processing, after which a process for detecting an in-focus position where a focus evaluation value is at a peak is executed. In the case where the in-focus position could not be detected by the AF search operation, the AF search operation is carried out again having reduced the exposure amount from the appropriate exposure, thus avoiding saturation of an image signal caused by a point light source. In this manner, a more accurate in-focus position is detected based on a result of performing a plurality of AF search operations, after which a lens is moved to the obtained in-focus position. As such, this technique enables accurate focusing operations to be carried out for objects in which high-luminance point light sources are interspersed, such as night scenes or the like.

CMOS sensors used as the image sensors of image capturing apparatuses such as digital cameras have different exposure timings from line to line. Accordingly, with illumination conditions in which the intensity of the illumination light fluctuates at frequencies such as 50 Hz, 60 Hz, and so on, as with a fluorescent lamp, band-shaped brightness variations that move in the vertical direction will appear in the screen; this is known as "line flicker". Such line flicker affects the appearance of through-the-lens images displayed in an LCD. Meanwhile, in the case where the lines affected by the line flicker differ for each readout timing, or in other words, in the case where the line flicker fluctuates, the output of the focus evaluation value for each line will fluctuate due to the line flicker fluctuation; as a result, the correct peak position cannot be detected, which affects the accuracy of the AF.

In response to this, a method is known in which flicker is suppressed by setting the shutter speed of the image capturing apparatus to $\frac{1}{50}$ seconds, $\frac{1}{100}$ seconds, or the like in the case of a fluorescent lamp that uses a 50 Hz AC power source, and to $\frac{1}{60}$ seconds, $\frac{1}{120}$ seconds, or the like in the case of a 60 Hz AC power source. Although doing so improves the appearance of the through-the-lens image, it does not result in an optimal exposure setting for AF processing, and conversely will sometimes inhibit the AF accuracy. This is because exposure settings that reduce the depth of field by prioritizing an open aperture and suppress noise through lower gain settings are preferable in order to make it easier to detect the peak position during AF processing.

Accordingly, as a method for ensuring AF accuracy when flicker occurs, in Japanese Patent Laid-Open No. 2008-130531, the image capturing frame rate is set to a timing synchronized to the cycle of the flicker, which prevents fluctuations in the line flicker in order to carry out exposure control suited to AF processing even under light sources that cause flicker.

However, in the aforementioned Japanese Patent No. 3105334, the focusing operations are carried out so that the area of a high-luminance signal is reduced in the case of a high-luminance object/a point light source object. As such, the method is suitable for a case where the primary object is configured only of a point light source, but there are cases where accurate focus adjustment cannot be carried out, such as cases where a point light source object and a normal illuminated object are present together. Recent devices have higher numbers of pixels, making it impossible to ignore even slight shifts in focus and increasing demand for more accurate focus adjustment.

The following can be considered for reasons why accurate focus adjustment cannot be carried out:
the influence of the color of the light source; and
a drop in luminance caused by illuminated areas of a normal object blurring, leading to a drop in the area of high-luminance portions.

Meanwhile, Japanese Patent Laid-Open No. 2002-196220 discloses performing the AF search having reduced the exposure amount beyond the appropriate exposure amount in the case where the in-focus position cannot be detected, and performing the AF search a plurality of times, namely at the appropriate exposure and at an exposure lower than the appropriate exposure, in the case where the brightness is lower than a specified value. However, there is a problem in that in the case of a high-luminance object, a point light source object, or the like, the influence thereof will result in a position that is not the in-focus position being erroneously determined as an in-focus position, and this problem cannot be solved even if measures are taken for cases where the in-focus position cannot be detected, as with Japanese Patent Laid-Open No. 2002-196220. There is a further problem in that performing the AF search a plurality of times, at the appropriate exposure and at an exposure lower than the appropriate exposure, increases the amount of time required for the AF processing.

Furthermore, although the conventional technique disclosed in Japanese Patent Laid-Open No. 2008-130531 does stabilize the focus evaluation value by preventing fluctuations in line flicker, the focus evaluation value output drops within the AF frame in areas that overlap with lines where the exposure amount has dropped due to the line flicker, and thus the accuracy of the AF cannot be ensured. Further still, the appearance of the through-the-lens image displayed in the LCD worsens due to the occurrence of the line flicker.

SUMMARY OF THE INVENTION

The present invention has been made in consideration of the above situation, and makes it possible to maintain the quality of a through-the-lens image displayed in a display unit without increasing the processing time required to perform focus adjustment accurately.

According to the present invention, provided is an image capturing apparatus comprising: an image sensing unit, having a plurality of pixels arranged two-dimensionally, configured to photoelectrically convert an object image formed by an optical imaging system including a focus lens and output an electrical image signal; a control unit configured to control at least one of a readout rate and an exposure condition independently for each of different regions of the image sensing unit; and a calculation unit configured to calculate a plurality of focus evaluation values based on image signals read out from the pixels present in a focus detection area in one of the plurality of different regions at a plurality of different focus lens positions while moving the focus lens, and find an in-focus position of the focus lens based on the plurality of focus evaluation values, wherein the control unit takes a first image signal read out from a first region among the plurality of different regions as an image signal for display to be output to a display unit.

According to the present invention, provided is a control method for an image capturing apparatus including an image sensing unit, having a plurality of pixels arranged two-dimensionally, configured to photoelectrically convert an object image formed by an optical imaging system including a focus lens and output an electrical image signal, the method comprising: a control step of controlling at least one of a readout rate and an exposure condition independently for each of different regions of the image sensing unit; and a calculation step of calculating a plurality of focus evaluation values based on image signals output from the pixels present in a focus detection area in one of the plurality of different regions at a plurality of different focus lens positions while moving the focus lens, and finding an in-focus position of the focus lens based on the plurality of focus evaluation values, wherein a first image signal read out from a first region among the plurality of different regions is taken as an image signal for display to be output to a display unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a diagram illustrating an example of an AF frame;

FIG. 23 is a flowchart illustrating normal image AF processing according to the fifth embodiment;

FIG. 25 is a diagram illustrating processing for setting a reliability for an AF frame according to a sixth embodiment.

DESCRIPTION OF THE EMBODIMENTS

Exemplary embodiments of the present invention will be described in detail in accordance with the accompanying drawings.

First Embodiment

Apparatus Configuration and Basic Operations

Figure 1:
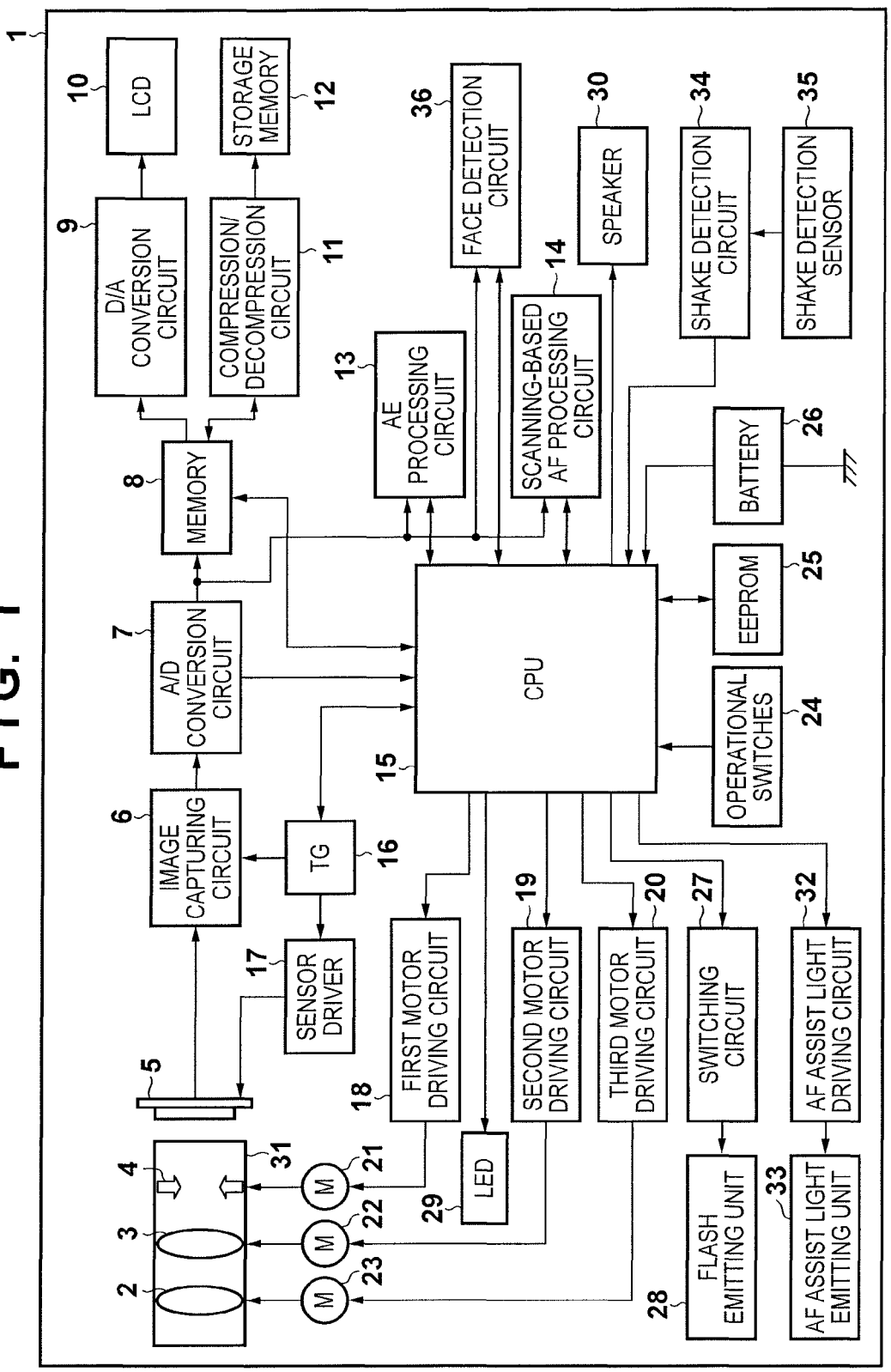
FIG. 1 is a block diagram illustrating a configuration of an image capturing apparatus according to first through third embodiments of the present invention.

FIG. 1 is a block diagram illustrating the overall configuration of an image capturing apparatus according to a first embodiment of the present invention.

In FIG. 1, an image capturing apparatus 1 corresponds to a digital still camera, a digital video camera, or the like, for example. A zoom lens group 2 and a focus lens group 3 configure an optical imaging system. An aperture 4 controls a light flux amount that traverses the optical imaging system. The zoom lens group 2, the focus lens group 3, and the aperture 4 are configured within a lens barrel 31.

An object image that has traversed the optical imaging system is formed upon an image capturing surface of an image sensor 5 and is photoelectrically converted. An image capturing circuit 6 receives an electrical signal resulting from the photoelectric conversion performed by the image sensor 5 and generates a predetermined image signal by executing various types of image processes. An A/D conversion circuit 7 converts the analog image signal generated by the image capturing circuit 6 into a digital image signal.

A memory 8 is a memory such as a buffer memory that temporarily stores the digital image signal output from the A/D conversion circuit 7. A D/A conversion circuit 9 reads out the image signal stored in the memory 8 and converts that signal into an analog signal, and also converts the signal into an image signal in a format suitable for playback. An LCD 10 is a liquid-crystal display (LCD) or the like that displays the image signal resulting from the conversion performed by the D/A conversion circuit 9. A compression/decompression circuit 11 reads out the image signal temporarily stored in the memory 8 and performs a compression process, an encoding process, and so on thereon, and converts the signal into image data in a format suitable for storage in a storage memory 12. The storage memory 12 stores the image data processed by the compression/decompression circuit 11. The compression/decompression circuit 11 also reads out the image data stored in the storage memory 12 and performs a decompression process, a decoding process, and so on thereon, and converts the data into image data in a format optimized for playback and display.

A variety of types of memories can be employed as the storage memory 12. For example, a semiconductor memory such as a flash memory that has a card or stick shape and can be removed from the apparatus, a magnetic storage medium such as a hard disk or a flexible disk, or the like may be employed.

An AE processing circuit 13 carries out automatic exposure (AE) processing using the image signal output from the A/D conversion circuit 7. Meanwhile, a scanning-based AF processing circuit 14 carries out autofocus (AF) processing using the image signal output from the A/D conversion circuit 7.

A CPU 15 controls the various elements of the image capturing apparatus 1, and includes a memory used for computations. A timing generator (TG) 16 generates a predetermined timing signal. A sensor driver 17 drives the image sensor 5 based on the timing signal from the TG 16.

A first motor driving circuit 18 drives the aperture 4 by driving an aperture driving motor 21 under the control of the CPU 15. A second motor driving circuit 19 drives the focus lens group 3 by driving a focus driving motor 22 under the control of the CPU 15. A third motor driving circuit 20 drives the zoom lens group 2 by driving a zoom driving motor 23 under the control of the CPU 15.

Operational switches 24 are configured of various types of switches, and include a main power switch, a release switch, a playback switch, a zoom switch, an optical viewfinder (OVF)/electronic viewfinder (EVF) toggle switch, and so on, for example. The main power switch is a switch for starting the image capturing apparatus 1 and supplying power. The release switch is configured of a two-stage switch, where a first stroke (SW1) generates an instruction signal for starting AE processing and AF processing, which start prior to image capturing operations (recording operations). Then, a second stroke (SW2) generates an instruction signal for starting actual exposure operations. The playback switch starts playback operations, whereas the zoom switch causes zoom operations to be carried out by moving the zoom lens group 2 of the optical imaging system.

An EEPROM 25 is a read-only memory that can be electrically rewritten, and stores, in advance, programs for carrying out various types of control, data used to perform various types of operations, and so on. Reference numeral 26 indicates a battery. A switching circuit 27 controls the emission of flash light by a flash emitting unit 28. A display element 29 uses an LED or the like to make warning displays and so on. A speaker 30 uses audio to provide guidance, make warnings, and so on.

An AF assist light emission unit 33 is configured of a light source, such as an LED, that illuminates all or part of an object when obtaining an AF evaluation value (focus evaluation value). An AF assist light driving circuit 32 drives the AF assist light emission unit 33. A shake detection sensor 35 detects camera shake and a shake detection circuit 34 processes a signal from the shake detection sensor 35. A face detection circuit 36 receives the output from the A/D conversion circuit 7 and detects a position, size, and so on of a face in the screen.

Basic operations performed by the image capturing apparatus 1 configured in this manner will be described hereinafter. First, when capturing an image, an amount of light in a light flux from an object that traverses the lens barrel 31 of the image capturing apparatus 1 is adjusted by the aperture 4, and an image thereof is formed on a light-receiving surface of the image sensor 5. The object image that has been formed is converted into an electrical signal by the image sensor 5 through a photoelectric conversion process, and the signal is output to the image capturing circuit 6. The image capturing circuit 6 executes various types of signal processes on the input signal and generates a predetermined image signal. The image signal is output to the A/D conversion circuit 7, converted into a digital image signal (image data), and temporarily stored in the memory 8. The image data stored in the memory 8 is output to the D/A conversion circuit 9 and converted into an analog signal, converted into an image signal in a format suited for display, and displayed in the LCD 10 as an image. Note that an electronic viewfinder (EVF) function can be realized by repeating the processes from the output of the image signal by the image sensor 5 to the display of the image in the LCD 10 every predetermined interval.

Meanwhile, the image data stored in the memory 8 is also output to the compression/decompression circuit 11. After a compression process has been carried out by a compression circuit in the compression/decompression circuit 11, the data is converted into image data in a format suited to storage, and is then stored in the storage memory 12.

On the other hand, the image data digitized by the A/D conversion circuit 7 is also output to the AE processing circuit 13, the scanning-based AF processing circuit 14, and the face detection circuit 36, in addition to the memory 8.

First, the AE processing circuit 13 receives the input image data and carries out computational processes such as cumulative addition on luminance values in a single screen's worth of image data. Through this, an AE evaluation value is calculated based on the brightness of the object. The calculated AE evaluation value is output to the CPU 15.

Meanwhile, the scanning-based AF processing circuit 14 receives the input image data and extracts a high-frequency component thereof using a high-pass filter (HPF) or the like, and furthermore carries out computational processing such as cumulative addition and calculates an AF evaluation value corresponding to a contour component amount in the high frequency range. This scanning-based AF processing is typically carried out on image data corresponding to a partial area of the screen that has been specified as an AF region. The AF region may be a single location in a central area or an arbitrary area of the screen, a plurality of locations in a central area or an arbitrary area of the screen and adjacent thereto, a plurality of discretely distributed locations, or the like.

The face detection circuit 36 receives the input image data, finds characteristic areas of the face in the image, such as the eyes, eyebrows, or the like, and finds the position of a person's face in the image. The size, tilt, and so on of the face is also found from positional relationships such as the distances between characteristic portions of the face.

Meanwhile, a predetermined timing signal is output from the TG 16 to the CPU 15, the image capturing circuit 6, and the sensor driver 17, and the CPU 15 carries out various types of control in synchronization with this timing signal. The image capturing circuit 6 receives the timing signal from the TG 16 and performs various types of image processes, such as color signal separation, in synchronization therewith. Furthermore, the sensor driver 17 receives the timing signal from the TG 16 and drives the image sensor 5 in synchronization therewith.

The CPU 15 also controls the first motor driving circuit 18, the second motor driving circuit 19, and the third motor driving circuit 20. The driving of the aperture 4, the focus lens group 3, and the zoom lens group 2 is controlled via the aperture driving motor 21, the focus driving motor 22, and the zoom driving motor 23, respectively, as a result. In other words, the CPU 15 carries out AE control, which adjusts the aperture value of the aperture 4 to an appropriate value, by driving the aperture driving motor 21 by means of controlling the first motor driving circuit 18 based on the AE evaluation value and the like calculated by the AE processing circuit 13. The CPU 15 also carries out AF control, which moves the focus lens group 3 to an in-focus position, by driving the focus driving motor 22 by means of controlling the second motor driving circuit 19 based on the AF evaluation value calculated by the scanning-based AF processing circuit 14. In the case where the zoom switch (not shown) in the operational switches 24 has been manipulated, the CPU 15 in response thereto carries out magnification operations (zoom operations) of the optical imaging system, which moves the zoom lens group 2, by driving of the zoom driving motor 23 by means of controlling the third motor driving circuit 20.

Meanwhile, playback operations are started when, for example, the playback switch (not shown) in the operational switches 24 is manipulated to an on state. Here, the image data stored in the storage memory 12 in a compressed state is output to the compression/decompression circuit 11, undergoes a decoding process, a decompression process, and so on in a decompression circuit in the compression/decompression circuit 11, and is output to and temporarily stored in the memory 8. This image data is furthermore output to the D/A conversion circuit 9 and converted into an analog signal, converted into an image signal in a format suited for display, and displayed in the LCD 10 as an image.

Next, the configuration of pixels provided in the image sensor 5 shown in FIG. 1 will be described with reference to FIG. 2. Note that although FIG. 2 indicates four pixels arranged in the vertical direction, in actuality, the image sensor 5 includes an extremely large number of pixels arranged two-dimensionally.

Reference numeral 201 indicates a pixel that receives light from the lens barrel 31; this pixel photoelectrically converts light incident on the surface thereof and outputs the result as an electrical signal. The pixel 201 includes a photodiode 202, a transfer transistor 203, an amplifier 204, and a reset transistor 205. The transfer transistor 203 and the reset transistor 205 operate in response to a signal from a vertical scanning circuit 206. The vertical scanning circuit 206 includes a shift register, a signal generating circuit that generates driving signals for the transfer transistor 203 and so on to drive the respective pixels, and the like. By controlling the transfer transistor 203 and the reset transistor 205 using the generated driving signals (TX1 to 4, RS1 to 4, and so on), a charge in the photodiode 202 can be reset and read out, thus a charge accumulation period can be controlled.

Meanwhile, a horizontal scanning circuit 209 includes a shift register, a column amp circuit 210, a signal output selection switch 211, an output circuit (not shown) for output to the exterior, and so on. The signals read out from the pixel can be amplified by changing settings of the column amp circuit 210 through a signal from the sensor driver 17.

Figure 2:
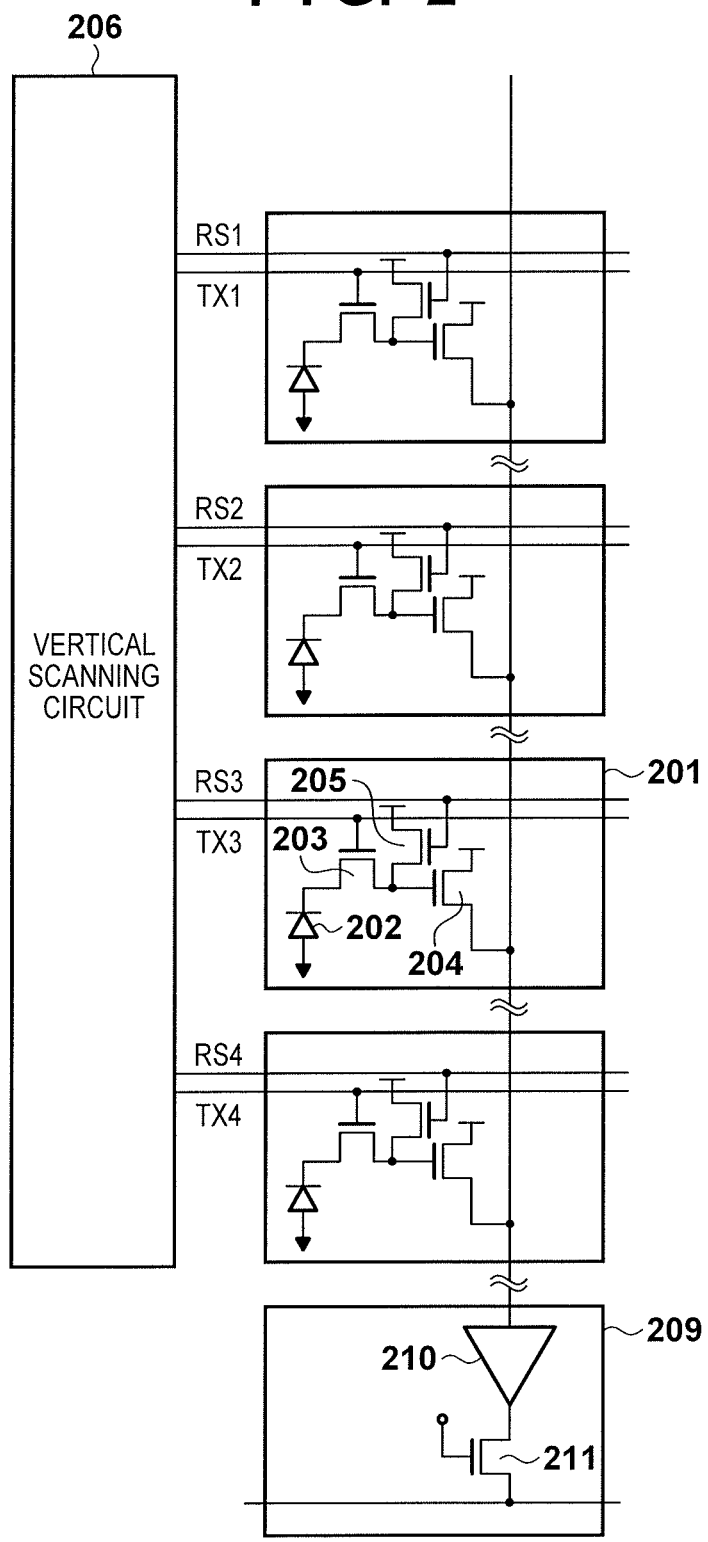
FIG. 2 is a diagram illustrating the configuration of pixels provided in the image capturing apparatus according to an embodiment.
Figure 3:
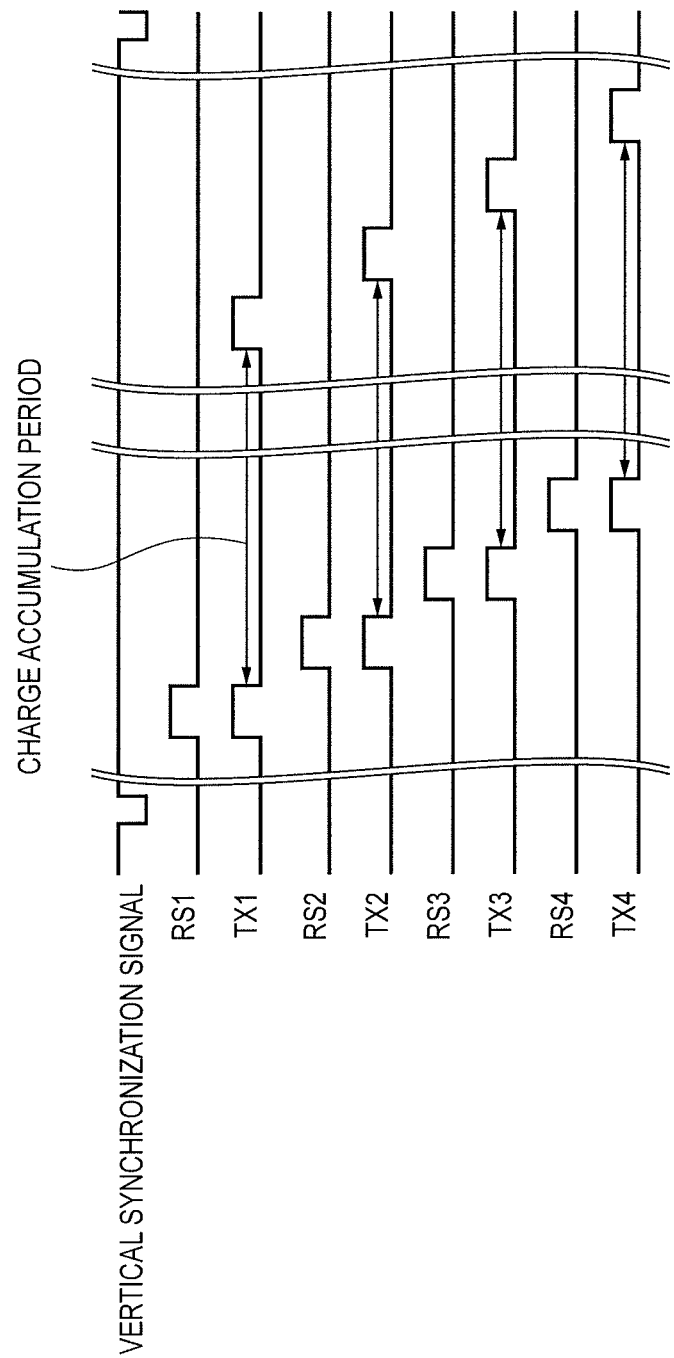
FIG. 3 is a timing chart illustrating signals output from a vertical scanning circuit when obtaining an image.

Next, typical control of the image sensor 5 having pixels configured as shown in FIG. 2, performed when obtaining an image, will be described with reference to FIGS. 3 and 4. FIG. 3 is a timing chart illustrating signals output from the vertical scanning circuit 206 when obtaining an image.

When both a TX signal (TX1 to 4) and an RS signal (RS1 to 4) in each row become high, the charge in the photodiode 202 of each pixel is reset, whereas charge accumulation starts when both the TX signal and the RS signal become low. This operation is carried out sequentially according to a predetermined order under conditions set by the TG 16. Then, after a predetermined charge accumulation period has passed, the TX signal becomes high again, and the charge in the photodiode 202 is read out to a gate of the amplifier 204. An image signal is generated from the signal from the amplifier 204 and is output through the horizontal scanning circuit 209. This operation is also carried out under conditions set by the TG 16.

In the present embodiment, the image sensor 5 provided in the image capturing apparatus 1 is a CMOS image sensor. Accordingly, depending on the settings of the shift register in the vertical scanning circuit 206, it is possible to select in what order to drive the transfer transistors 203 of a given row; furthermore, the same row can be selected repeatedly and the signals read out therefrom. Furthermore, depending on the settings of the shift register in the horizontal scanning circuit 209, it is possible to select which column signal will be output from among signals in the same row, by causing the selection switch 211 of that column to operate. Through this, it is possible to specify from which pixels and in which order signals are to be read out.

Figure 4:
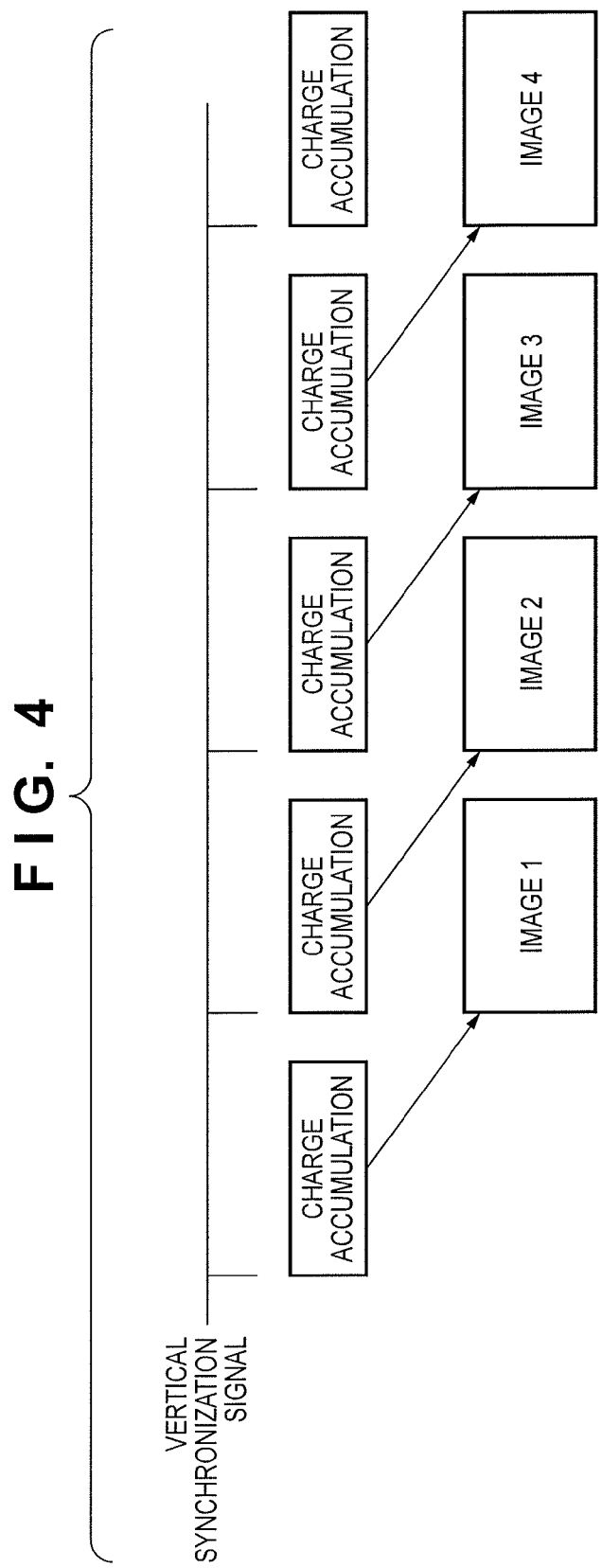
FIG. 4 is a diagram illustrating charge accumulation periods and image readout timings.

FIG. 4 illustrates charge accumulation periods and the timings at which accumulated charges are read out as images. Exposure and signal readout are carried out based on vertical synchronization signals generated by the TG 16 and the sensor driver 17.

Overall Flow of Image Capture Processing

Next, image capture processing according to the first embodiment will be described using the flowchart shown in FIG. 5. The image capture processing sequence described hereinafter is executed when the main power switch of the image capturing apparatus 1 is on and an operational mode of the image capturing apparatus 1 is an image capturing (recording) mode.

First, in step S1, the CPU 15 starts an EVF display, displaying an image that traverses the lens barrel 31 and is formed on the image sensor 5 in the LCD 10. Next, in step S2, the CPU 15 confirms the state of the release switch. When the release switch is manipulated by a user and SW1 turns on, the process advances to step S3, where the AE processing is executed. The scanning-based AF processing is then carried out in step S4. The scanning-based AF processing will be described in detail later.

If a result of the scanning-based AF processing indicates that the scene can be focused, an AF OK display is carried out in step S5. Here, a process for lighting the display element 29, displaying a green frame in the LCD 10, or the like is carried out, for example. However, in the case where it is not determined that the scene can be focused in step S4, an AF NG display is carried out in step S5. Here, a process for causing the display element 29 to blink, displaying a yellow frame in the LCD 10, or the like is carried out, for example. Note that as long as the method is capable of making a notification to the user, the method of the display performed in step S5 is not limited to the aforementioned display methods.

Next, in step S6, the CPU 15 checks the state of SW2; when SW2 turns on, the process advances to step S7, where the image is captured and the series of image capture processing ends.

Scanning-Based AF Processing

Next, the scanning-based AF processing carried out in step S4 will be described with reference to the flowchart in FIG. 6. Note that in the following descriptions, an operation for obtaining the AF evaluation value (focus evaluation value) while moving the focus lens group 3 is referred to as "scanning", and an interval between positions of the focus lens group 3 for obtaining the AF evaluation value is referred to as a "scanning interval". Furthermore, a range across which the focus lens group is moved in order to obtain the AF evaluation value is referred to as a "scanning range", and a frame indicating a focus detection area, which is a region from which an image signal is obtained in order to obtain the AF evaluation value, is referred to as an "AF frame".

In the present embodiment, it is assumed that in the case where the facial detection was unsuccessful or the size of a detected face was lower than a predetermined value, the AF frame is set to a central area of the screen or an arbitrary area in the screen, and to a plurality of locations adjacent thereto, as shown in FIG. 9. FIG. 9 illustrates an example in which a plurality of AF frames are set to a central area and a plurality of locations adjacent thereto.

First, in step S601, it is determined, based on a result of the facial detection performed by the face detection circuit 36, whether or not facial detection has succeeded, and if so, whether or not the size of the detected face is greater than or equal to a predetermined size. The process advances to step S605 in the case where a face having a size greater than or equal to the predetermined value has been detected, whereupon normal image AF processing is carried out. In the case where a face has been detected, the AF frame is set to the detected face, the scanning is carried out within the set AF frame, and the in-focus position is obtained. The method for obtaining the in-focus position carried out in step S605 will be described later.

In the case where a face has been detected, the size of the AF frame is matched to the size of the face in step S605; however, reducing the size of the AF frame reduces a signal amount when obtaining the AF evaluation value and makes it impossible to ensure the accuracy of the AF, and as such, a lower limit is placed on the size of the AF frame. Accordingly, a point light source object will almost never be included in the AF frame if the detected face is sufficiently large, but a point light source object may be included in the AF frame in the case where the detected face is small. For this reason, the process advances to step S602, rather than to step S605, both in the case where a face could not be detected and in the case where a face has been detected but the size of the face is less than a predetermined value, whereupon it is determined whether or not there is a point light source object.

Figure 5:
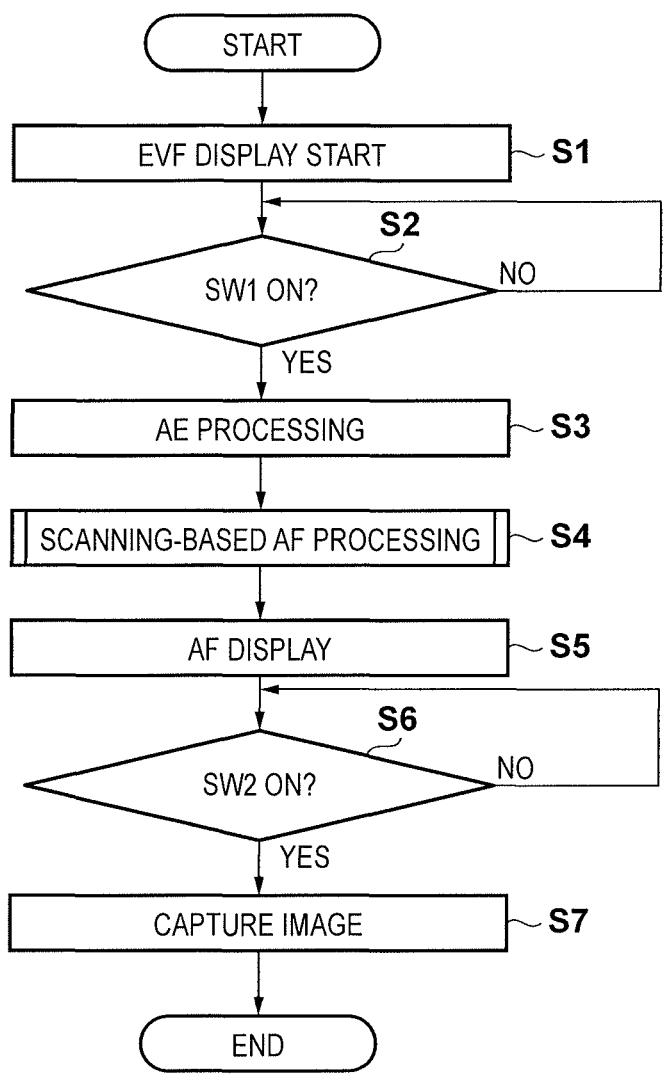
FIG. 5 is a flowchart illustrating an image capture processing sequence according to the first embodiment.

In the case where the detected face is small, the facial detection was unsuccessful, or the like, it is determined in step S602 whether or not the obtained image is of a lower luminance than a predetermined luminance, based on a result of the AE processing performed in step S3 of FIG. 5. The process advances to step S605 in the case where the image is brighter than the predetermined luminance, whereupon the normal image AF processing is carried out. Because no face has been detected or the detected face is small, the in-focus position is obtained through scanning a central frame as shown in FIG. 9 or by scanning each of a plurality of AF frames set through a known method, such as AF frames from an arbitrary area in the screen set by the user. On the other hand, in the case where the image is darker than the predetermined luminance, it is determined whether or not a point light source object is present in each AF frame in step S603. The process carried out in step S603 will be described in detail later.

In the case where a result of the determination indicates that a point light source object is present in every AF frame (YES in step S604), the focus adjustment cannot be carried out with AF processing for normal images; thus the process advances to step S609, where the point light source AF processing (described later) is carried out, after which the process advances to step S607.

On the other hand, in the case where the result of the determination in step S603 indicates that a point light source object is not present in any of the AF frames (NO in step S604), the process advances to step S606, where the normal image AF processing that obtains the in-focus position through scanning is carried out in the AF frames where the point light source object is not present.

The process advances to step S608 in the case where the focus can be adjusted to the in-focus position in any of the AF frames based on the AF evaluation value obtained in step S605, S606, or S609 (NO in step S607). In step S608, the focus lens group 3 is controlled to an in-focus position selected from the in-focus positions of the AF frames where the focus can be adjusted, in accordance with a predetermined algorithm. An example of this algorithm is known from Japanese Patent No. 02620235, for example; to describe briefly, a closest in-focus position is selected from among in-focus positions of objects that are not determined as an anterior obstacle of the scene. Conversely, in the case where the focus cannot be adjusted in any of the AF frames (YES in step S607), the process advances to step S610, where the focus lens group 3 is controlled to the focus lens position, called a hyperfocal position, where the focus lens group 3 focuses on the closest position of the depth of field that includes infinity on the far side of the field.

Determination of Point Light Source Object

Figure 7:
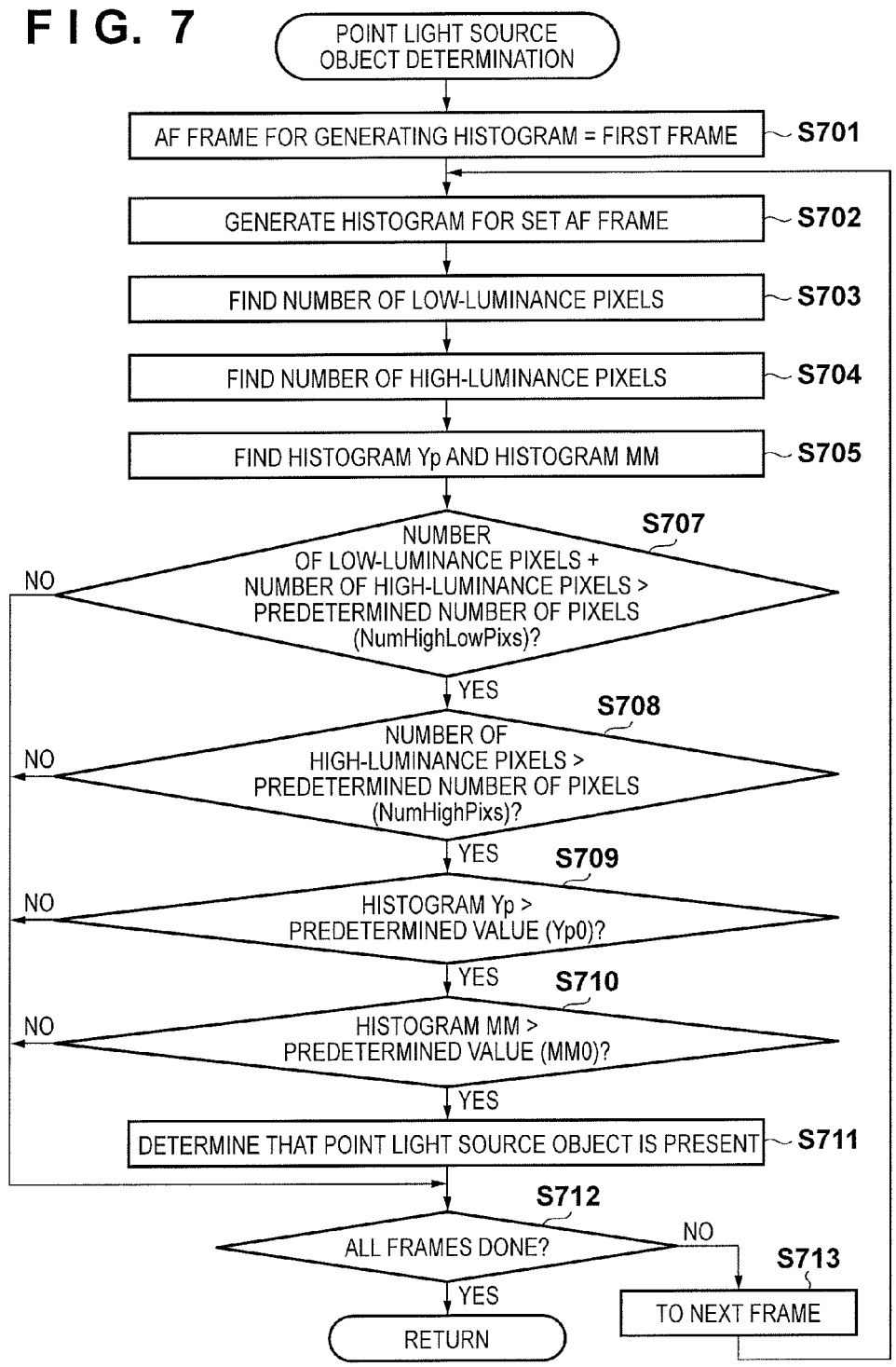
FIG. 7 is a flowchart illustrating an operational procedure for determining a point light source object according to the first and second embodiments.

Next, operations for determining the point light source object, carried out in step S603, will be described. For example, assuming the AF frames are set as shown in FIG. 9, whether or not a point light source object is present in those AF frames is determined using a histogram expressing a luminance distribution in the AF frames. The operational procedure is illustrated in FIG. 7.

First, in step S701, an AF frame position for finding the histogram expressing the luminance distribution is set as a first frame (a frame 00 in FIG. 9). Next, in step S702, a histogram is generated in the AF frame that has been set. Here, "histogram" is generated through processes for obtaining a luminance value for each pixel included in the AF frame for which the histogram is to be generated and then finding how many pixels having each luminance value are present. In the case where the post-A/D conversion luminance values are 0 to 255, for example, the histogram is generated by obtaining how many pixels having each luminance value of 0 to 255 are present.

Figure 8:
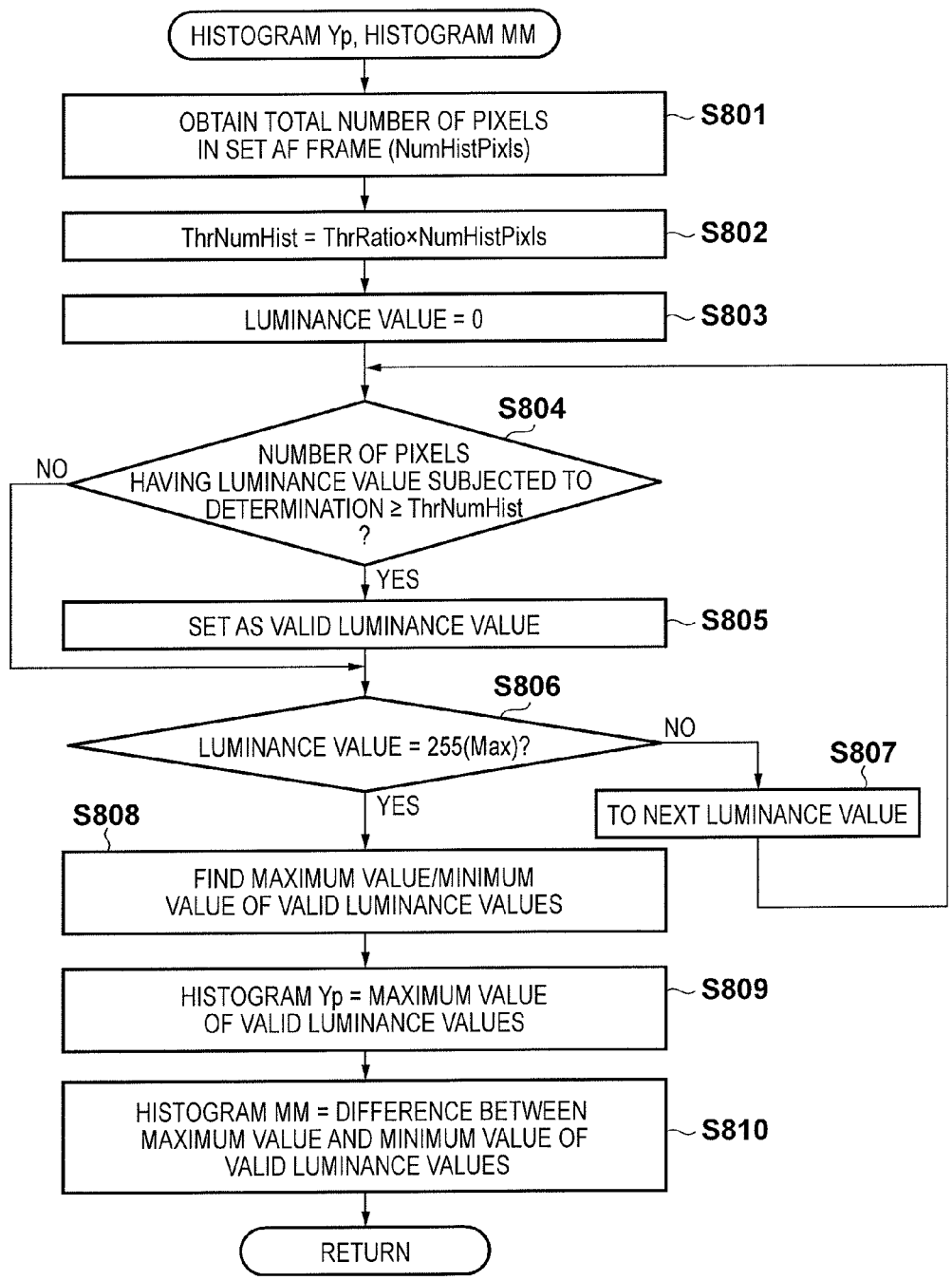
FIG. 8 is a flowchart illustrating an operational procedure for finding a histogram Yp and a histogram MM according to the first and second embodiments.

Then, in step S703, a number of pixels whose luminances are lower than a predetermined luminance value is obtained from the histogram that has been generated, and this number is taken as a low-luminance pixel number NumBlightLow. Then, in step S704, a number of pixels whose luminances are higher than a predetermined luminance value is obtained from the histogram, and this number is taken as a high-luminance pixel number NumBlightHigh. Next, in step S705, a histogram Yp and a histogram MM are found. Operations for finding the histogram Yp and the histogram MM will be described here with reference to FIG. 8.

First, in step S801, a total number of pixels within the AF frame for which the histogram has been generated is obtained. This is taken as NumHistPixs. Next, in step S802, a threshold ThrNumHist for a number of pixels whose luminance values are considered to be valid is found by finding the product of the total number of pixels NumHistPixs and a ratio ThrRatio of a number of pixels considered to be valid. The threshold ThrNumHist is used in order to eliminate luminance values caused by noise and the like. Once the threshold ThrNumHist has been found, the luminance values are reset to 0 in step S803, and a determination as to whether or not each luminance value is a valid luminance value is carried out in order starting from a luminance value of 0.

In step S804, a number of pixels having luminance value subjected to the determination is obtained using the histogram, and the obtained number of pixels is then compared to the threshold ThrNumHist. In the case where the number is greater than or equal to the threshold, the luminance value is taken as a valid luminance value in step S805, whereas in the case where the number is less than the threshold ThrNumHist, the luminance value is taken as an invalid luminance value occurring due to noise or the like, and are not used when finding the histogram Yp and the histogram MM. In step S806, it is determined whether or not the luminance value subjected to the determination is a maximum value (255, for example); if the luminance value is not the maximum value, the process advances to step S807, after which the next-highest luminance value is taken as the luminance value subjected to the determination and the process returns to step S804.

When it is determined in step S806 that the luminance value subjected to the determination is the maximum value, the process advances to step S808, where the maximum value and a minimum value of the luminance values determined to be valid are found. In step S809, the maximum value of the luminance values determined to be valid is recorded as the histogram Yp, and in step S810, a difference between the maximum value and the minimum value of the luminance values determined to be valid is recorded as the histogram MM. The procedure then moves to step S707 of FIG. 7.

Once the four indices, namely NumBlightLow, NumBlightHigh, the histogram Yp, and the histogram MM, have been found, it is determined, through the processing described hereinafter, whether or not those indices meet respective predetermined conditions. In the case where all of the indices meet the conditions, it is determined that the AF frame includes a point light source object. In other words, a frame is determined to include a point light source object in the case where there are many low-luminance areas, no less than a certain amount of high-luminance areas exists, the high-luminance areas are sufficiently bright, and the contrast is high.

First, in step S707, it is determined whether or not a sum of the number of low-luminance pixels NumBlightLow and the number of high-luminance pixels NumBlightHigh is higher than a predetermined number of pixels (NumHighLowPixs), and the process advances to step S708 when the sum is higher than the predetermined number and to step S712 when the sum is not higher than the predetermined number. Next, in step S708, it is determined whether or not the number of high-luminance pixels NumBlightHigh is greater than a predetermined number of pixels (NumHighPixs), and the process advances to step S709 when the number is greater than the predetermined number and to step S712 when the number is not greater than the predetermined number. In step S709, it is determined whether the histogram Yp is greater than a predetermined value (Yp0), and the process moves to step S710 when the histogram Yp is greater than the predetermined value and to step S712 when the histogram Yp is not greater than the predetermined value. Furthermore, in step S710, it is determined whether the histogram MM is greater than a predetermined value (MM0), and the process moves to step S711 when the histogram MM is greater than the predetermined value and to step S712 when the histogram MM is lower than the predetermined value.

In the case where all of the conditions have been met in step S707 to step S710, it is determined that a point light source object is present in that AF frame, and that AF frame is determined to include a point light source object in step S711.

In step S712, it is determined whether or not the determination has ended for all of the AF frames. In the case where the AF frames are set as shown in FIG. 9, the determination is carried out from frame 00, to frame 01, to frame 02, to frame 10, and so on to frame 21 and frame 22; thus in this case, it is determined whether or not the determination for frame 22 has ended. In the case where the determination has not ended for all of the AF frames, the process advances to step S713, where the next frame is set for determination and the aforementioned processing is repeated. If the determination of the frame 00 has ended, the frame 01 is set for the next determination; if the determination of the frame 01 has ended, the frame 02 is set for the next determination; and so on. When the determination for all of the AF frames has ended, the procedure moves to step S604 of FIG. 6.

Normal Image AF Processing

Next, the normal image AF processing carried out in step S605 and step S606 will be described using FIGS. 10 and 11.

First, a method for obtaining the image signal used for AF processing according to the first embodiment will be described with reference to FIG. 10. In the present first embodiment, at least one of an exposure condition and a readout rate is independently controlled for for-display pixels in the image sensor 5 for obtaining an EVF image and focus detection pixels in the image sensor 5 for carrying out the AF processing, while signals from the for-display pixels and the focus detection pixels resulting from this independent control can be obtained in parallel. Accordingly, in the first embodiment, respective exposure conditions for an EVF (display) signal and an AF (focus detection) signal are set in a two-line period, and the reset and output transfer of the image sensor 5 are executed at different timings. However, depending on the brightness of the object during image capturing, the optimal exposure conditions may be the same for both, in which case the reset and output transfer are executed at the same timing.

In order to obtain the EVF signal, the exposure conditions, and particularly the charge accumulation period, are determined by taking into consideration the exposure amount, panning, tracking of object movement, and so on that is optimal for the user's ability to view the object. On the other hand, for the AF signal, the exposure conditions, and particularly the charge accumulation period, are determined by taking into consideration the exposure amount, AF time, object movement during the AF time, the influence of camera shake on the AF processing, and so on that are optimal for scanning-based AF in the case where a point light source object such as a lighting source is not present.

The charge accumulation period for EVF is set, for example, with ⅛ second on a slow shutter speed side and a minimum charge accumulation period determined based on the capabilities of the image sensor 5 as a limit on the fast shutter speed side, and the values of the aperture and the column amp circuit 210 are adjusted by referring to the result of the AE processing performed in step S3, setting the exposure amount to an appropriate amount. Meanwhile, the charge accumulation period for AF is set, for example, with ¹⁄₃₂ second on the slow shutter speed side and the minimum charge accumulation period determined based on the capabilities of the image sensor 5 as a limit on the fast shutter speed side, and the values of the aperture 4 and the column amp circuit 210 are adjusted by referring to the result of the AE processing performed in step S3, setting the exposure amount to an appropriate amount. Accordingly, the charge accumulation period determined under low illumination is shorter for AF than for EVF, and as a result, the readout rate for AF is faster. For example, the AF charge accumulation period is taken as ¹⁄₃₂ second (a readout rate of 32 FPS) and the charge accumulation period for the EVF image is taken as ⅛ second (a readout rate of 8 FPS), with the values of the aperture 4 being equal.

Figure 10:
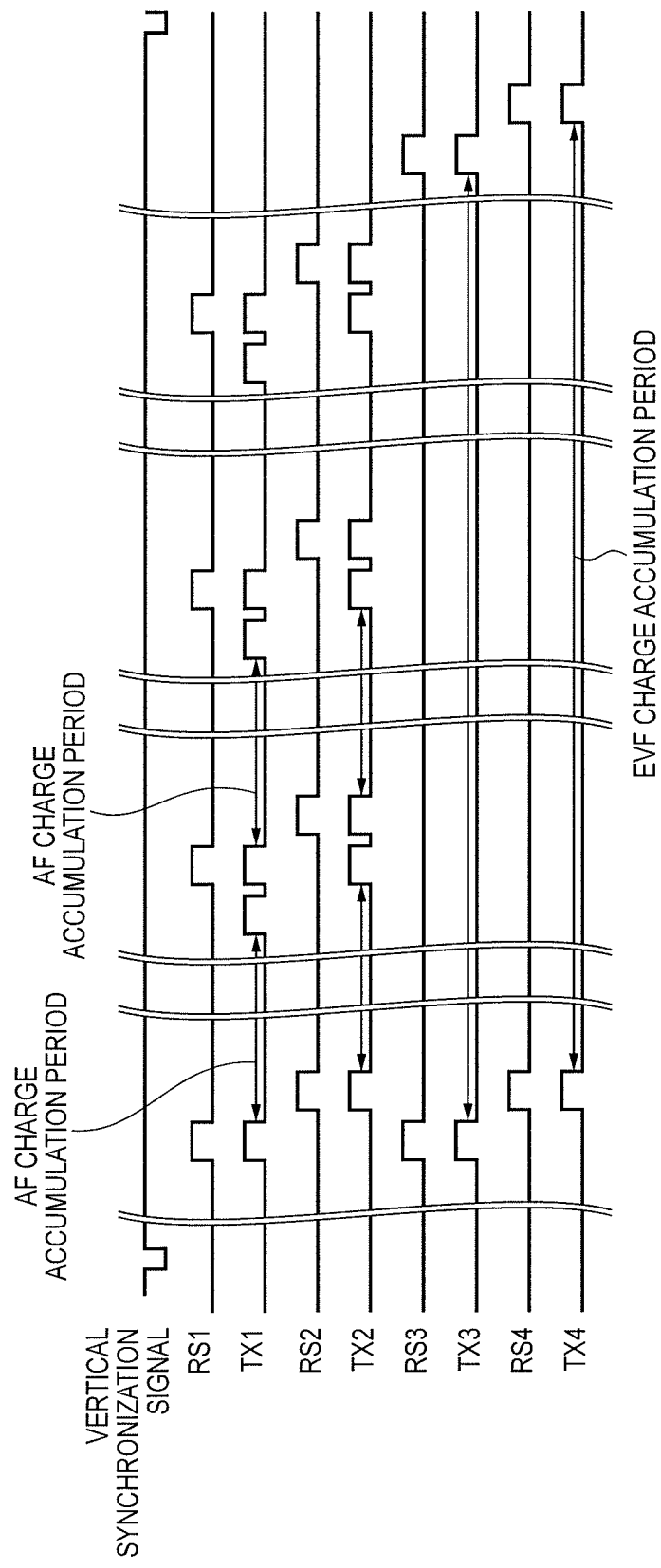
FIG. 10 is a timing chart illustrating operations performed by the vertical scanning circuit during normal image AF processing according to the first embodiment.
Figure 11:
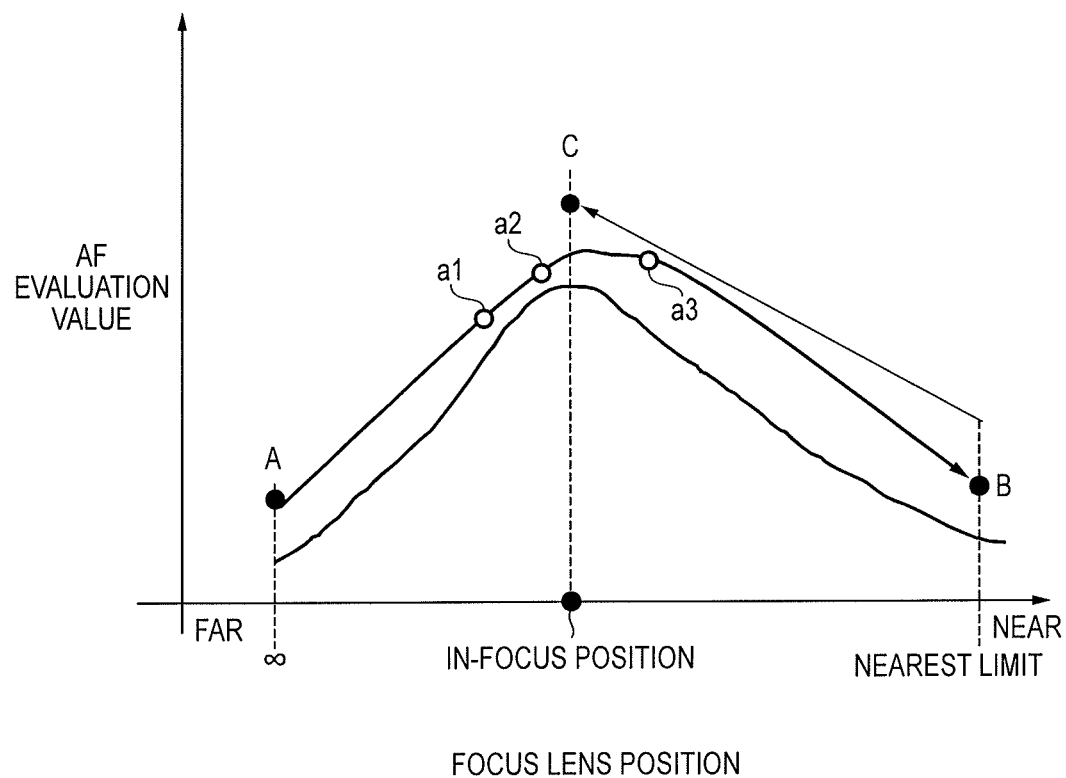
FIG. 11 is a graph illustrating scanning-based AF during normal image AF processing according to the first embodiment.

Once the exposure conditions (charge accumulation period) have been set, the TX signals and the RS signals are controlled as indicated in FIG. 10. FIG. 10 is a timing chart illustrating signals generated by the vertical scanning circuit 206 in order to obtain signals for EVF and AF.

In FIG. 10, when both the TX signal (TX1 to 4) and the RS signal (RS1 to 4) in each row become high, the charge in the photodiode 202 of each pixel is reset, whereas charge accumulation starts when both the TX signal and the RS signal become low. This operation is carried out sequentially according to a predetermined order under conditions set by the TG 16. Then, in a row for AF, TX1 and TX2 become high sequentially after the predetermined charge accumulation period has passed; the charge in the photodiode 202 is read out from the amplifier 204, is output via the horizontal scanning circuit 209, and the signal for AF is obtained as a result. Then, TX1 and RS1, and then TX2 and RS2, both become high sequentially, and the row for AF is reset. This operation is repeated in order to obtain the AF signal. Meanwhile, in a row for EVF, the TX3 and TX4 signals become high sequentially after the predetermined charge accumulation period has passed; the charge in the photodiode 202 is read out from the amplifier 204 and is output via the horizontal scanning circuit 209. The EVF image is obtained as a result.

Next, the scanning-based AF method for finding the in-focus position based on the AF signal obtained by the image sensor 5 in the two-line period as mentioned above will be described using FIG. 11. Scanning-based AF is a process that finds a position of the focus lens group 3 in which high-frequency components extracted from the AF signal are the most numerous, and is carried out on an AF frame-by-AF frame basis.

The CPU 15 controls the focus driving motor 22 via the second motor driving circuit 19 that controls the driving of the focus driving motor 22. Through this, the focus lens group 3 is driven from a position corresponding to infinity ("A" in FIG. 11) to a position corresponding to the closest distance set for each image sensing mode ("B" in FIG. 11). The AF evaluation values, which are the output of the scanning-based AF processing circuit 14, are obtained during this driving, and when the driving of the focus lens group 3 has ended, the position of the focus lens group 3 where the obtained AF evaluation value is maximum, or in other words, the in-focus position, is found ("C" in FIG. 11).

Note that the obtainment of the AF evaluation value from the scanning-based AF processing circuit 14 is carried out at a predetermined scanning interval rather than at all positions of the focus lens group 3 in order to accelerate the scanning-based AF. For example, the AF evaluation value is obtained at a1, a2, and a3 shown in FIG. 11. In this case, the AF evaluation value is not found at the position C, and thus the in-focus position C is calculated from a point where the obtained AF evaluation value reaches a maximum and the points therebefore and thereafter. A reliability of the AF evaluation value is evaluated before finding the in-focus position where the AF evaluation value is maximum ("C" in FIG. 11) through such interpolation. Japanese Patent No. 04235422 and Japanese Patent No. 04185741 disclose specific examples of such a method, and thus descriptions thereof will be omitted here.

The normal image AF processing carried out in step S605 is carried out on all the AF frames set for scanning-based AF as described above, and if the reliability thereof is sufficient in each AF frame, the in-focus position where the AF evaluation value is maximum is found. However, the process for finding the point where the AF evaluation value is maximum is not carried out for AF frames where the reliability is insufficient.

In step S606, the aforementioned scanning-based AF is carried out only for the AF frames for which it has been determined that the normal image AF processing can be carried out. As in step S605, the in-focus position where the AF evaluation value is maximum is found if the reliability of the processed AF frame is sufficient, whereas the process for finding the in-focus position where the AF evaluation value is maximum is not carried out for AF frames where the reliability is insufficient.

In the case where the reliability of any of the AF frames is sufficient in the process of step S605 or step S606 (NO in step S607 of FIG. 6), the AF OK display is carried out in step S5 of FIG. 5. On the other hand, in the case where the result of evaluating the reliability of the AF evaluation values in all of the AF frames indicates that the reliability of all of the AF frames is low (YES in step S607 of FIG. 6), the AF NG display is carried out in step S5 of FIG. 5.

Point Light Source AF Processing

Next, the point light source AF processing carried out in step S609 will be described using FIGS. 12 and 13.

In the same manner as the normal image AF processing, a signal from the image sensor 5 for obtaining the EVF image and a signal from the image sensor 5 for carrying out the AF processing are obtained under different exposure conditions and are obtained in parallel at different readout rates in the point light source AF processing.

In the point light source AF processing as well, for the EVF signal, the exposure conditions, and particularly the charge accumulation period, are determined by taking into consideration the exposure amount optimal for the user's ability to view the object in the dark, as well as panning, tracking of object movement, and so on. On the other hand, for the AF signal, the exposure conditions, and particularly the charge accumulation period, are determined by taking into consideration the AF time, object movement during the AF time, the influence of camera shake on the AF processing, and the optimal exposure amount for scanning-based AF upon capturing a point light source object such as a lighting source.

In the point light source AF processing, the EVF charge accumulation period, the aperture 4 value, and the column amp circuit 210 value are adjusted, and referring to the result of the AE processing of step S3, an appropriate exposure amount for the case where a point light source object such as a lighting source is captured is set. Then, the AF charge accumulation period is set so that the exposure amount is reduced to a lower amount than the appropriate exposure for EVF, based on a point light source object ratio.

Specifically, the exposure amount is reduced as indicated below based on a ratio of the number of high-luminance pixels NumBlightHigh to the total number of pixels.

| NumBlightHigh Ratio | Amount by Which Exposure Amount is Reduced |
| --- | --- |
| greater than or equal to 50% | 0 steps (exposure amount not reduced beyond appropriate exposure for LCD display) |
| greater than or equal to 25% and less than 50% | 1 step |
| greater than or equal to 12.5% and less than 25% | 2 steps |
| greater than or equal to 6.25% and less than 12.5% | 3 steps |
| greater than or equal to 3.125% and less than 6.25% | 4 steps |
| greater than or equal to 1.5625% and less than 3.125% | 5 steps |
| less than 1.5625% | 6 steps |

At approximately 50% or more, AE is carried out on the area occupied by the point light source object, and thus it can be said that the exposure amount is appropriate for the point light source object and almost no saturated pixels are present. As the number of pixels occupied by the point light source object drops, an attempt is made to obtain an appropriate exposure amount for the entire screen; the exposure amount increases under the influence of dark areas aside from the point light source object, resulting in the point light source object becoming overexposed. As such, the point light source object will have an appropriate exposure amount if the exposure amount in that area is reduced. For this reason, the exposure amount is not reduced in the case where the ratio of high-luminance pixels is greater than or equal to 50%, but is reduced as the ratio of high-luminance pixels drops. The exposure amount is reduced by one step each time the ratio of high-luminance pixels halves.

The exposure amount for AF is set to be lower than the appropriate exposure amount for EVF when capturing a point light source object for the following reasons. With the exposure amount for EVF, pixels receiving light from point light sources such as lighting sources will become saturated, and thus the AF evaluation value will peak not at the correct in-focus position, but at positions of the focus lens group 3 before and after that original in-focus position, as indicated by an appropriate exposure curve 1201 shown in FIG. 12. The correct in-focus position cannot be obtained as a result. Accordingly, during AF, the exposure amount is reduced, and an AF evaluation value curve such as that indicated by the underexposure curve 1202 in FIG. 12 can be obtained through scanning Accordingly, the charge accumulation period for AF is shorter than the charge accumulation period for EVF under low illumination, and as a result, the readout rate for AF is faster. For example, the AF charge accumulation period is taken as $1/128$ second (a readout rate of 128 FPS) and the charge accumulation period for an image displayed in the LCD is taken as $1/32$ second (a readout rate of 32 FPS). The values of the aperture 4 are equal, and are fully open in low illumination, such as a case where a point light source object such as a lighting source is captured.

Figure 13:
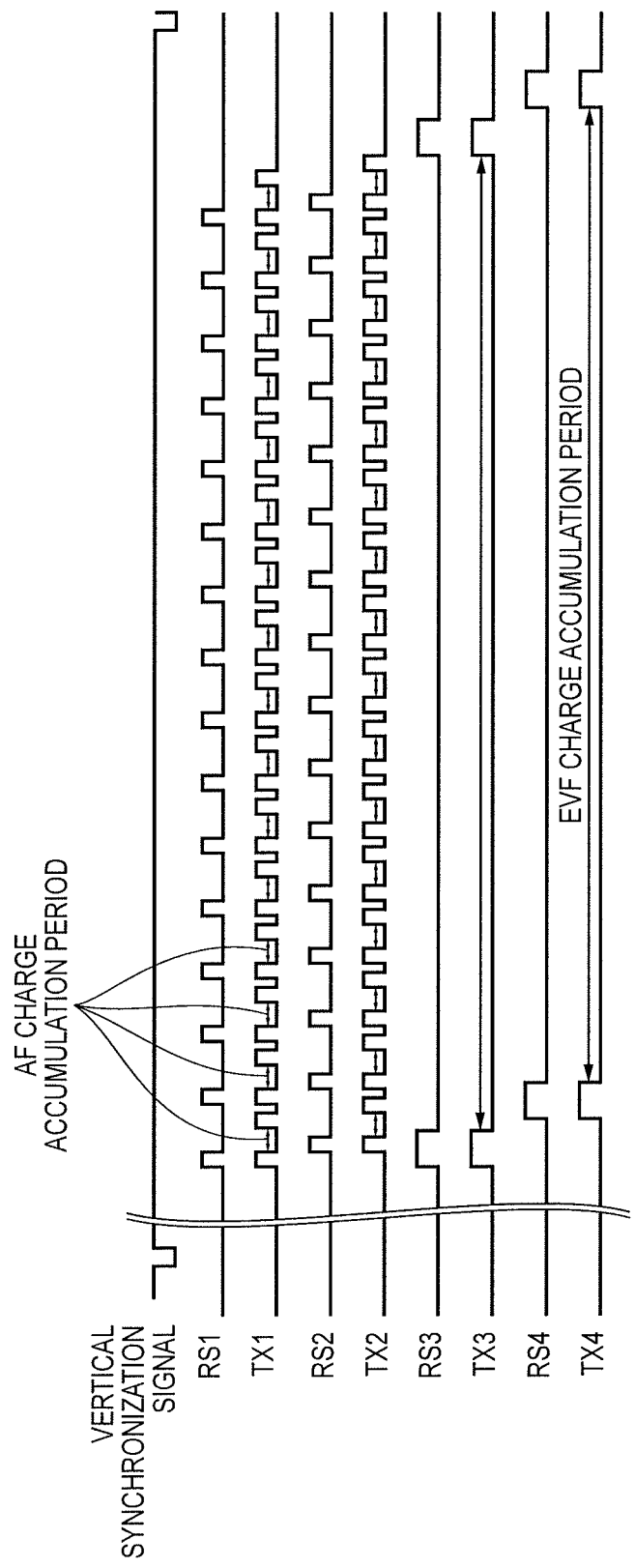
FIG. 13 is a timing chart illustrating operations performed by the vertical scanning circuit during point light source AF processing according to the first embodiment.

Once the exposure conditions (charge accumulation period) have been set, the TX signals and the RS signals are controlled as indicated in FIG. 13. FIG. 13 is a timing chart illustrating signals generated by the vertical scanning circuit 206 in order to obtain signals for EVF and AF.

In FIG. 13, when both the TX signal (TX1 to 4) and the RS signal (RS1 to 4) in each row become high, the charge in the photodiode 202 of each pixel is reset, whereas charge accumulation starts when both the TX signal and the RS signal become low. This operation is carried out sequentially according to a predetermined order under conditions set by the TG 16. Then, in a row for AF, TX1 and TX2 become high sequentially after the predetermined charge accumulation period has passed; the charge in the photodiode 202 is read out from the amplifier 204, is output via the horizontal scanning circuit 209, and the signal for AF is obtained as a result. Then, TX1 and RS1, and then TX2 and RS2, both become high sequentially, and the row for AF is reset. This operation is repeated in order to obtain the AF signal. Meanwhile, in a row for EVF, the TX3 and TX4 signals become high sequentially after the predetermined charge accumulation period has passed; the charge in the photodiode 202 is read out from the amplifier 204 and is output via the horizontal scanning circuit 209. The EVF image is obtained as a result.

Next, the scanning-based AF method for a point light source, that finds the in-focus position based on the AF signal obtained from the image sensor 5 in the two-line period as described above, will be described using FIG. 12.

The CPU 15 controls the focus driving motor 22 via the second motor driving circuit 19 that controls the driving of the focus driving motor 22. Through this, the focus lens group 3 is driven from a position corresponding to infinity ("A" in FIG. 12) to a position corresponding to the closest distance set for each image sensing mode ("B" in FIG. 12). The AF evaluation values, which are the output of the scanning-based AF processing circuit 14, are obtained during this driving, and when the driving of the focus lens group 3 has ended, the position where the AF evaluation value is maximum ("C" in FIG. 12) is found based on the obtained AF evaluation value.

Note that the obtainment of the output from the scanning-based AF processing circuit 14 is carried out at a predetermined scanning interval rather than at all positions of the focus lens group 3 in order to accelerate the scanning-based AF. For example, the AF evaluation value is obtained at a1, a2, and a3 shown in FIG. 12. In such a case, the in-focus position C is calculated from the point where the AF evaluation value is a maximum value and the points therebefore and thereafter. Note that the reliability of the AF evaluation value is evaluated before finding the point where the AF evaluation value is maximum ("C" in FIG. 12) through such interpolation, in the same manner as in the normal image AF processing.

This process is carried out on all the AF frames set for scanning-based AF as described above, and if the reliability is sufficient in any of the AF frames (NO in step S607 of FIG. 6), the in-focus position where the AF evaluation value is maximum is found. The process for finding the in-focus position where the AF evaluation value is maximum is not carried out for AF frames where the reliability is insufficient. When the reliability of any of the AF frames is sufficient, the AF OK display is carried out in step S5 of FIG. 5.

On the other hand, in the point light source AF processing, the AF processing is carried out using the EVF signal in the case where the reliability is low in all of the AF frames. This is because when performing AF using the AF signal results in a low reliability in all of the AF frames, there is a possibility that an object that is not a point light source has been erroneously determined to be a point light source object. Accordingly, the AF is carried out using the EVF signal, which has an appropriate exposure amount for an object that is not a point light source.

Figure 12:
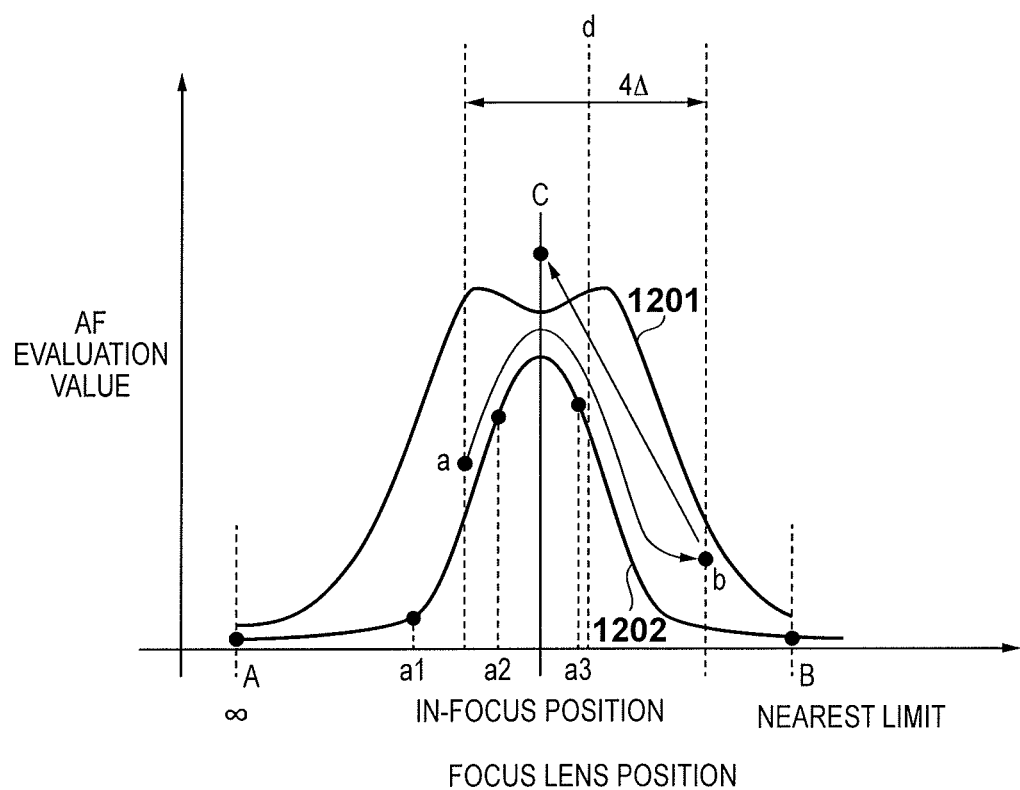
FIG. 12 is a graph illustrating scanning-based AF during point light source AF processing according to the first embodiment.

In the case where a point light source object is erroneously determined and the exposure amount of the EVF signal is appropriate, scanning will result in an AF evaluation value such as that indicated by the curve 1202 in FIG. 12, for a case of underexposure, being obtained from the EVF signal.

However, the focus lens group 3 is driven so that the scanning interval is optimized at the readout rate for the AF signal, and thus the scanning interval may be too wide at the readout rate for the EVF signal and an accurate peak position of the AF evaluation value may not be obtained. For example, an obtained peak position indicated by d in FIG. 12 may be shifted from the correct peak position of C. This shift amount 4 can be estimated as approximately half of the scanning interval when the peak position of the AF evaluation value is found using the EVF signal (d in FIG. 12). Accordingly, a range approximately four times the shift amount $\Delta$ (4$\Delta$) with the peak position that has been found (d in FIG. 12) being the center is set as the scanning range, the scanning is carried out again in the set scanning range 4$\Delta$, and a more accurate AF evaluation value peak position (C in FIG. 12) is found.

For example, in the case where the readout rate for the AF signal is 128 FPS and the readout rate for the EVF signal is 32 FPS, the shift amount $\Delta$ can be estimated at a depth of approximately 10, and thus the scanning range may be set to a depth of ±20 with d in FIG. 12 being the center.

The EVF signal and the AF signal are obtained in parallel at different exposure conditions and different readout rates at this time as well, the exposure conditions for both signals are set at the two-line period, and the timings of the reset of and the output transfer from the image sensor are caused to differ. The method for determining the timings are the same as in step S605 and step S606.

In the re-scanning, the CPU 15 controls the focus driving motor 22 via the second motor driving circuit 19 and drives the focus lens group 3 from a scanning start position ("a" in FIG. 12) to a scanning end position ("b" in FIG. 12). The AF evaluation values are obtained from the scanning-based AF processing circuit 14 during this driving, and when the driving of the focus lens group 3 has ended, the in-focus position where the obtained AF evaluation value is maximum ("C" in FIG. 12) is found from the obtained AF evaluation value.

As with other scanning-based AF, the reliability of the AF evaluation value is evaluated before finding the in-focus position in this case as well. The reliability is determined for all of the AF frames that have been scanned; if the reliability is sufficient for any of the AF frames, the in-focus position is found for that AF frame, whereas the process for finding the in-focus position is not carried out for AF frames whose reliabilities are insufficient. In the case where the reliability for any of the AF frames is sufficient (NO in step S607 of FIG. 6), the AF OK display is carried out in step S5 of FIG. 5, whereas in the case where the reliability of all of the AF frames is low (YES in step S607 of FIG. 6), the AF NG display is carried out in step S5 of FIG. 5.

Note that in the case where single-point AF is set by the user or in the case where an AF frame is set for a facial position detected through facial AF in the AF processing in step S605, the aforementioned processing may be carried out only on that frame. Here, "single-point AF" refers to AF using a single frame in the center or AF using a single arbitrary frame specified by the user.

According to the first embodiment as described thus far, AF and EVF signals obtained in parallel under different exposure conditions are used, and thus more accurate focus adjustment can be carried out while maintaining the quality of the EVF image even in cases such as where a point light source object and a normal object are present together.

Second Embodiment

Next, a second embodiment of the present invention will be described. The second embodiment differs from the aforementioned first embodiment in that a process for roughly adjusting the focus (continuous AF) is carried out before SW1 turns on (that is, before an image capturing preparation instruction). This continuous AF is executed before determining whether or not a point light source is present within an AF frame, as will be described later. Note that the configuration of the image capturing apparatus 1 is the same as that illustrated in FIGS. 1 and 2, and thus descriptions thereof will be omitted.

Overall Flow of Image Capture Processing

Figure 14:
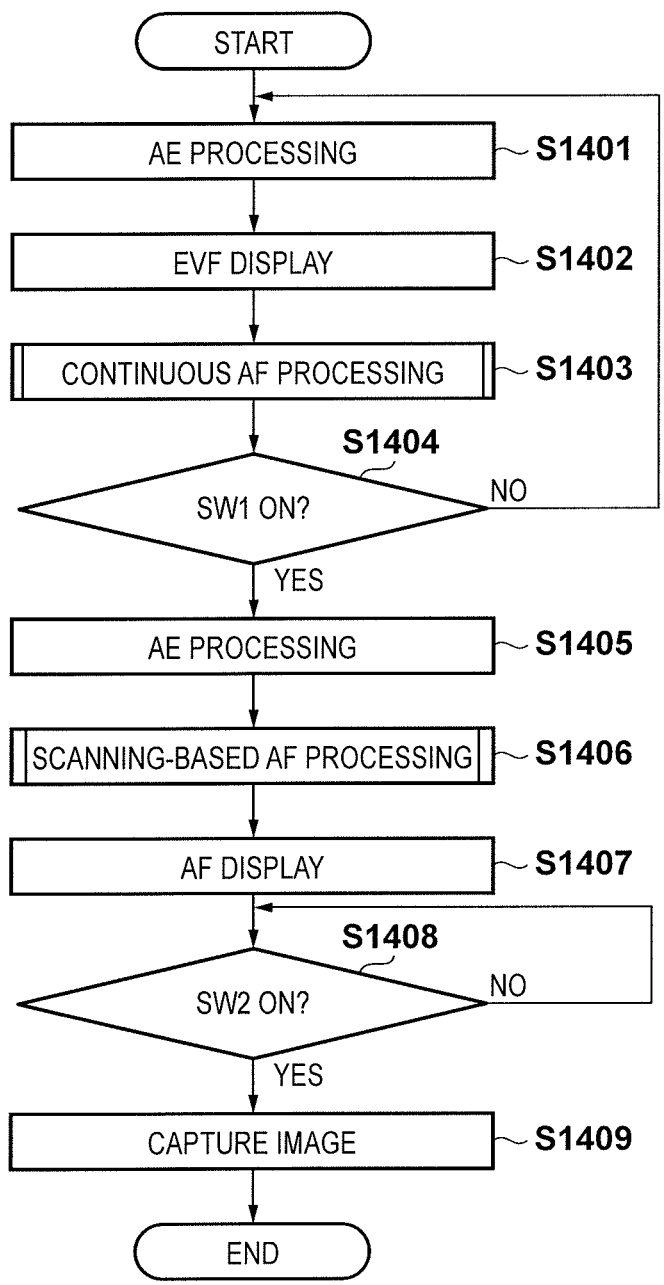
FIG. 14 is a flowchart illustrating an image capture processing sequence according to the second embodiment.

The image capture processing according to the second embodiment will be described using the flowchart shown in FIG. 14.

As in the first embodiment, the image capture processing sequence is executed when the main power switch of the image capturing apparatus 1 is on and an operational mode of the image capturing apparatus is an image capturing (recording) mode.

First, in step S1401, AE processing is executed, and as described in the first embodiment with reference to FIG. 10, an exposure amount appropriate for the EVF image and an exposure amount suited to the AF processing are found, and the image sensor 5 is driven so as to take on that exposure amount.

Next, in step S1402, the EVF display is started in the same manner as in the first embodiment. At this time, the CPU 15 controls the image sensor 5 to take on the exposure amount found in step S1401. Furthermore, in step S1403, continuous AF processing is carried out, and the focus lens group 3 is driven to a rough in-focus position. This process will be described later.

Then, in step S1404, the CPU 15 checks the state of the release switch; when the release switch is manipulated by the user and SW1 turns on, the process advances to step S1405, where the AE processing is executed. The scanning-based AF processing is then carried out in step S1406. This process will be described later.

If a result of the scanning-based AF processing indicates that the scene is in focus, the AF OK display is carried out in step S1407. Here, a process for lighting the display element 29, displaying a green frame in the LCD 10, or the like is carried out, for example. However, in the case where the scene is not in focus in step S1406, the AF NG display is carried out in step S1407. Here, a process for causing the display element 29 to blink, displaying a yellow frame in the LCD 10, or the like is carried out, for example. Note that as long as the method is capable of making a notification to the user, the method of the display performed in step S1407 is not limited to the aforementioned display methods.

Next, in step S1408, the CPU 15 confirms the state of SW2; when SW2 turns on, the process advances to step S1409, where the image is captured and the series of image capture processing ends.

Continuous AF Processing

Figure 15:
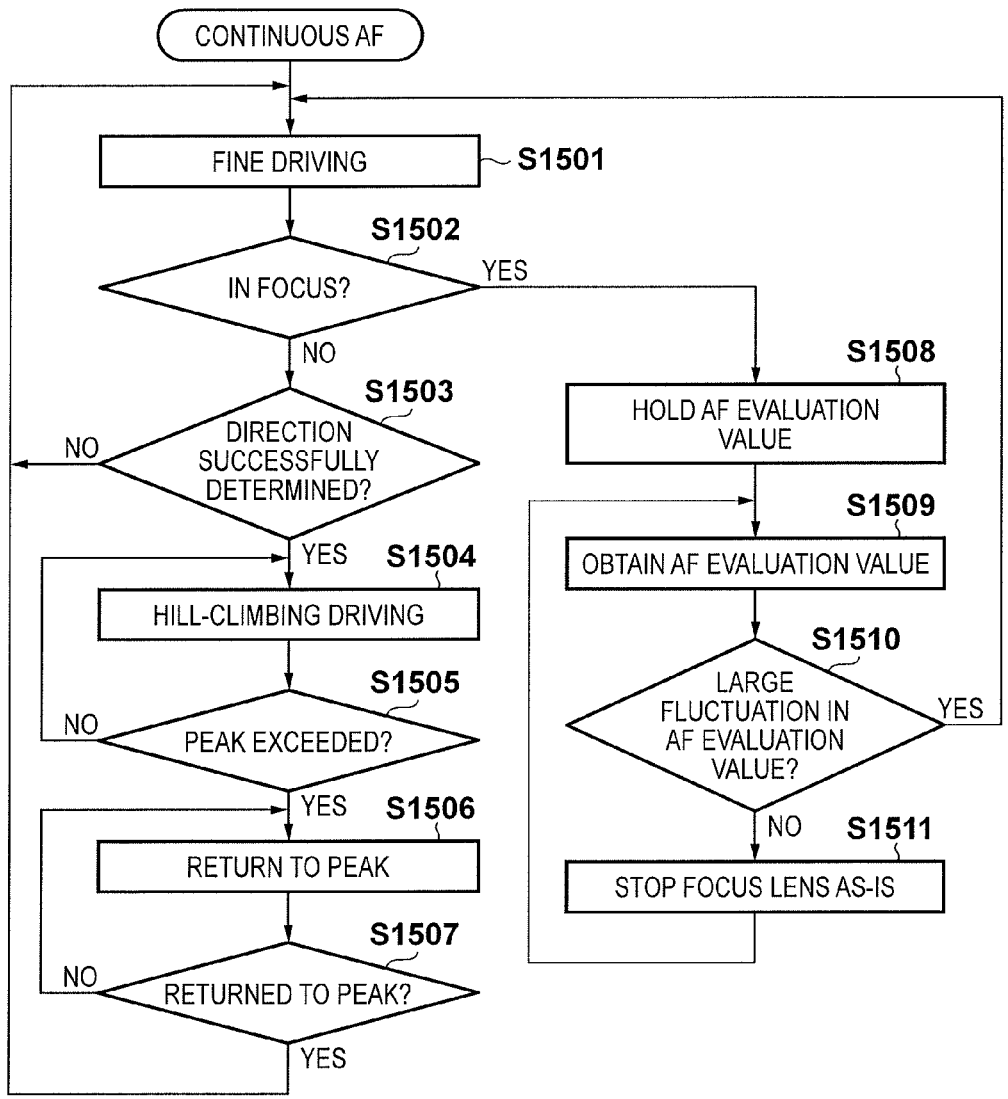
FIG. 15 is a flowchart illustrating continuous AF processing according to the second embodiment.

Next, the continuous AF processing carried out in step S1403 will be described with reference to the flowchart in FIG. 15. Note that the driving of the image sensor 5 in this processing is carried out according to the timing of the timing chart shown in FIG. 10.

When the continuous AF processing is started, in step S1501, fine driving operations are carried out, and it is determined whether the scene is in focus, or if the scene is not in focus, which direction the in-focus position is in. "Fine driving" is an operation in which the focus lens group 3 is driven in the direction to the nearest limit or the direction to the infinite limit in fine amounts (amounts in which changes in the focus cannot be seen in the EVF image) and whether the scene is in focus/out-of-focus and in which direction the focus lens group 3 should be driven to bring the scene into focus is detected from the obtained AF evaluation value.

In step S1502, in the case where the scene is determined to be in focus, the process advances to step S1508, where processes for in-focus state is carried out, whereas in the case where the scene is determined to be out-of-focus, the process advances from step S1502 to step S1503. If it is determined in step S1503 that the in-focus direction was successfully determined in step S1501, the process advances to step S1504; whereas, if the in-focus direction was not successfully determined in step S1501, the process returns to step S1501 and the fine driving is continued. In step S1504, the focus lens group 3 is driven through hill-climbing driving quickly in the direction in which the AF evaluation value increases. "Hill-climbing driving" is scanning that searches for the in-focus position while changing the scanning interval in accordance with the degree of focus during the hill-climbing driving. The scanning is carried out at a comparatively rough scanning interval of a depth of 5 to 10 in the case where the degree of focus is low; the scanning interval is then reduced as the degree of focus increases, and the scanning is carried out at a comparatively fine scanning interval of a depth of 2 to 4 near the in-focus position. If it is determined in step S1505 that the AF evaluation value has exceeded a peak, the process advances to step S1506, whereas the process returns to step S1504 and the hill-climbing driving is continued in the case where it is not determined that the AF evaluation value has exceeded the peak.

In step S1506, the position of the focus lens group 3 is returned to the position where the AF evaluation value was at the peak during the hill-climbing driving. In step S1507, it is determined whether the focus lens group 3 has returned to the position where the AF evaluation value was at the peak; the process returns to step S1501, where the fine driving is carried out again, in the case where the AF evaluation value has returned to the peak position, whereas the process returns to step S1506, where the operations for returning to the peak are continued, in the case where the AF evaluation value has not returned to the peak position.

Next, an in-focus restart determination process, carried out after the scene has been determined to be in focus in step S1502, will be described. In step S1508, the AF evaluation value when the scene has been determined to be in focus is held. In step S1509, the newest AF evaluation value at the same position of the focus lens group 3 is obtained. In step S1510, the AF evaluation value held in step S1508 is compared with the AF evaluation value newly obtained in step S1509; a restart is determined in the case where the difference therebetween is greater than or equal to a predetermined level, after which the process returns to step S1501 and the fine driving operations are resumed. By contrast, in the case where restart has not been determined in step S1510, the process advances to step S1511, where the focus lens group 3 is stopped as-is, the process returns to step S1509, and the restart determination is continued.

Scanning-Based AF Processing

Figure 16:
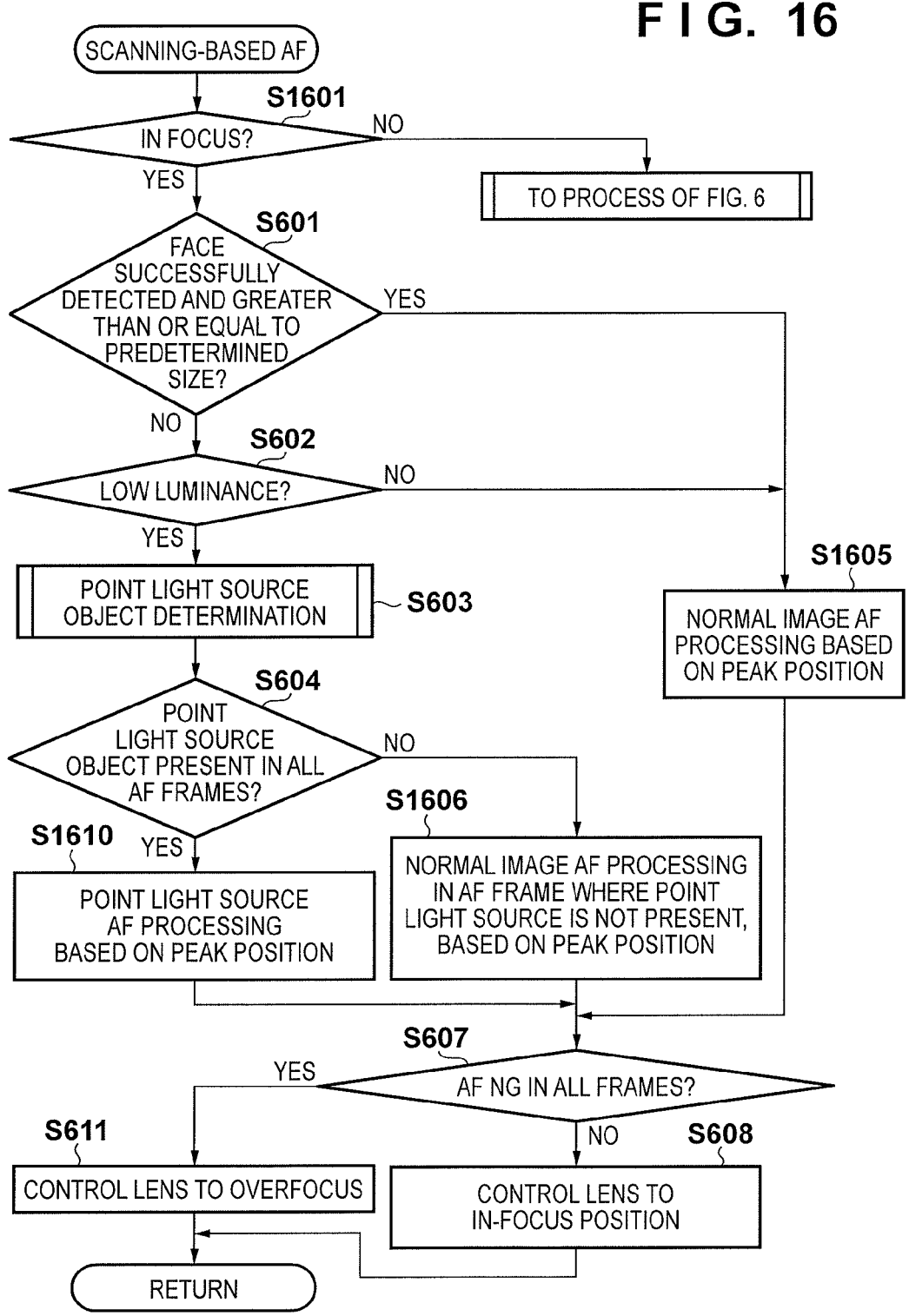
FIG. 16 is a flowchart illustrating scanning-based AF processing according to the second embodiment.

Next, the scanning-based AF processing executed in step S1406 will be described with reference to the flowchart in FIG. 16. Note that in FIG. 16, processes that are the same as those illustrated in FIG. 6 are given the same reference numerals, and descriptions thereof are omitted as appropriate.

Figure 6:
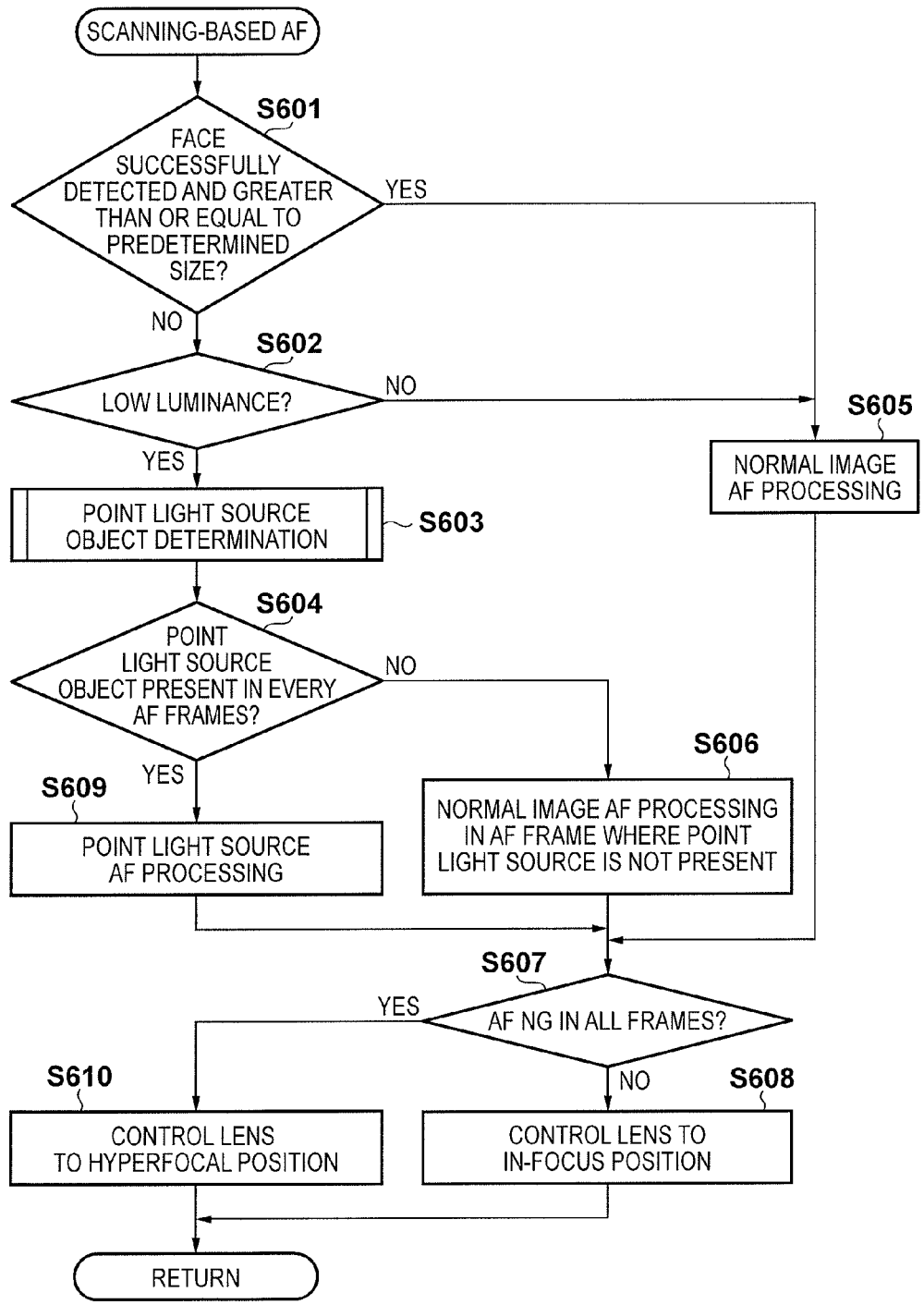
FIG. 6 is a flowchart illustrating scanning-based AF processing according to the first embodiment.

First, in step S1601, it is determined whether the scene was determined to be in focus by the continuous AF processing carried out in step S1403; if the scene was not determined to be in focus, the scanning-based AF processing described in the first embodiment with reference to FIG. 6 is carried out.

On the other hand, in the case where the scene was determined to be in focus in the continuous AF processing, the process advances to step S601. In steps S601 to S604, the processing described in the first embodiment with reference to FIG. 6 is carried out.

In the case where a point light source is present and it has been determined that normal image AF processing cannot be carried out (YES in step S604), the point light source AF processing is executed in step S1610. Here, because it has been determined that the scene is in focus in the continuous AF executed in step S1403 of FIG. 14 and a rough in-focus position has been found, it is only necessary to scan in the vicinity of that position.

The EVF and AF exposure amounts in step S1610 are determined in the same manner as in the point light source AF processing described in the first embodiment. However, in the second embodiment, the predetermined scanning range that is central to the peak of the AF evaluation value found through the continuous AF is scanned according to a predetermined scanning interval, as described earlier. The scanning range and scanning interval are determined taking into consideration the point light source object ratio, error in the in-focus position due to scanning at a rough interval, and the AF time, and the amounts thereof are as indicated below.

| NumBlightHigh Ratio | Scanning Range |
| --- | --- |
| greater than or equal to 3.125% | ±10 depth |
| less than 3.125% | ±15 depth |

Meanwhile, an object is recognized as a high-frequency object in the case where a point light source is small, and the maximum value thereof may be missed if the scanning interval is rough; as such, it is necessary to make the scanning interval finer by a certain amount. Accordingly, the scanning interval of the AF carried out in step S1610 is set to a depth of 2.5, for example.

In step S1605 and step S1606 as well, in which the normal image AF processing is carried out, the scanning range and the scanning interval are determined with the in-focus position determined as being in focus by the continuous AF being the center. As one example, the scanning range is set to a depth of ±5 with respect to a rough in-focus position, and the scanning interval is set to a depth of 2.5, in the AF carried out in step S1605 and step S1606. Then, the determined scanning range is scanned at the determined scanning interval, and the in-focus position is found for each AF frame through the same procedure as that carried out in step S605 and step S606 of FIG. 6 described in the first embodiment.

According to the second embodiment described thus far, the amount of time required to achieve an in-focus state after SW1 is turned on can be shortened, and the amount of time lag until an image is captured can be shortened as a result in addition to the effects described in the first embodiment.

Third Embodiment

Next, a third embodiment of the present invention will be described. The present third embodiment differs from the first embodiment in that a charge accumulation period at which pixels will not be saturated is searched out prior to SW1 turning on (prior to an image capturing preparation instruction), and the band of a band pass filter used during the normal image AF processing is switched based on the presence/absence of saturated pixels at the final charge accumulation period. Note that the configuration of the image capturing apparatus 1 is the same as that illustrated in FIGS. 1 and 2, and thus descriptions thereof will be omitted.

In the present third embodiment, the scanning-based AF processing circuit 14 detects a number of saturated pixels in the AF region and outputs that number, in addition to the AF evaluation value.

Image Capture Processing

Figure 17:
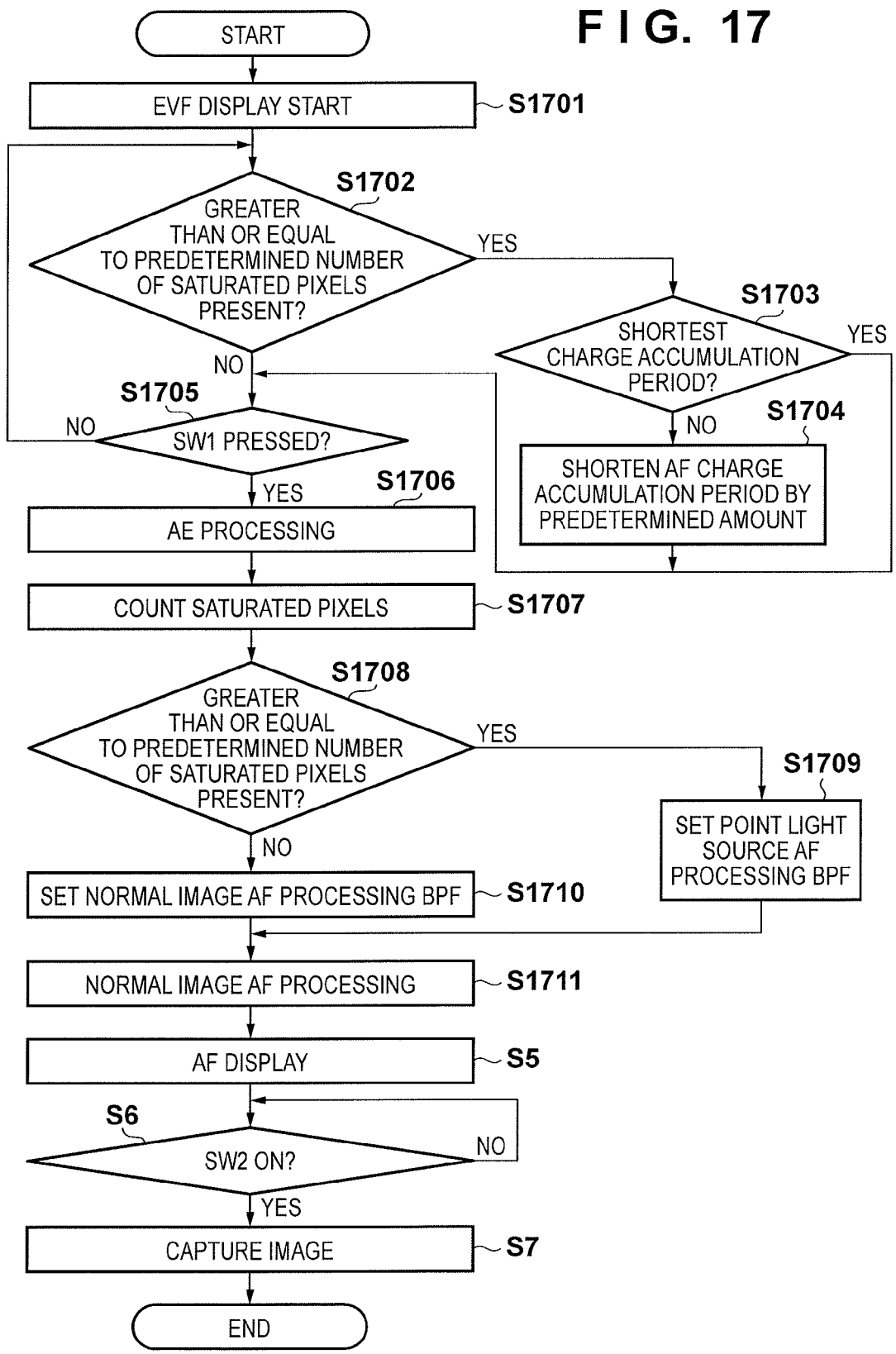
FIG. 17 is a flowchart illustrating an image capture processing sequence according to the third embodiment.

The image capture processing according to the third embodiment will be described using the flowchart shown in FIG. 17. The image capture processing sequence described hereinafter is executed when the main power switch of the image capturing apparatus 1 is on and an operational mode of the image capturing apparatus 1 is an image capturing (recording) mode.

First, in step S1701, the CPU 15 starts the EVF display, displaying an image that traverses the lens barrel 31 and is formed on the image sensor 5 in the LCD 10. Then, in step S1702, the scanning-based AF processing circuit 14 determines whether or not a saturated pixel, which has a maximum luminance level value, is present in the AF frame. The process advances to step S1703 in the case where the number of saturated pixels is greater than or equal to a predetermined number, and advances to step S1705 in the case where the number of saturated pixels is less than the predetermined number. In step S1703, it is determined whether the AF charge accumulation period currently set is a minimum charge accumulation period that can be set, and if the period is the minimum period, the process advances to step S1705. If the period is not the minimum charge accumulation period, the process moves to step S1704, where the AF charge accumulation period is shortened by a predetermined amount and the process advances to step S1705.

In step S1705, the CPU 15 checks the state of the release switch. When the release switch is manipulated by a user and SW1 turns on, the process advances to step S1706, where the AE processing is executed. Then, in step S1707, the scanning-based AF processing circuit 14 counts the saturated pixels.

In step S1708, it is determined whether the number of saturated pixels counted in step S1707 is greater than or equal to a predetermined number; when the number is greater than or equal to the predetermined number, it is determined that a point light source has been detected, and the process advances to step S1709, whereas when the number is not greater than or equal to the predetermined number, the process advances to step S1710. In step S1709, a higher band pass filter than the band pass filter normally used is set for the point light source AF processing, after which the process advances to step S1711. In the third embodiment, AF processing is carried out using an image signal that has passed through the set band pass filter. On the other hand, in the case where the number of saturated pixels counted is less than the predetermined number, it is determined that a point light source is not present; the process advances to step S1710, where the band pass filter normally used is set for the normal image AF processing, after which the process advances to step S1711. The scanning-based AF during the normal image AF processing in step S1711 is almost the same as the processing described in the first embodiment based on FIG. 11. Note that in the case where a point light source is determined to be present in step S1708, the AF evaluation value obtained from the scanning-based AF processing circuit 14 is normalized using an integrated value of luminances whose values drop near the in-focus position, so that the influence of the point light source can be reduced. Other processes are identical to those described in the first embodiment and will thus be omitted.

Note that although the number of saturated pixels that have maximum luminance level values are counted in the third embodiment, the configuration may be such that the number of high-luminance pixels having luminance values greater than or equal to a predetermined value are counted instead.

Fourth Embodiment

Next, a fourth embodiment of the present invention will be described. In the fourth embodiment, a process for determining whether or not flicker has occurred and resetting the AF exposure as necessary based on a flicker frequency in the case where flicker has occurred is carried out in addition to the processing described in the first embodiment. Accordingly, only the processing for resetting the AF exposure involved in the AE processing will be described, and descriptions of other processes will be omitted.

Figure 18:
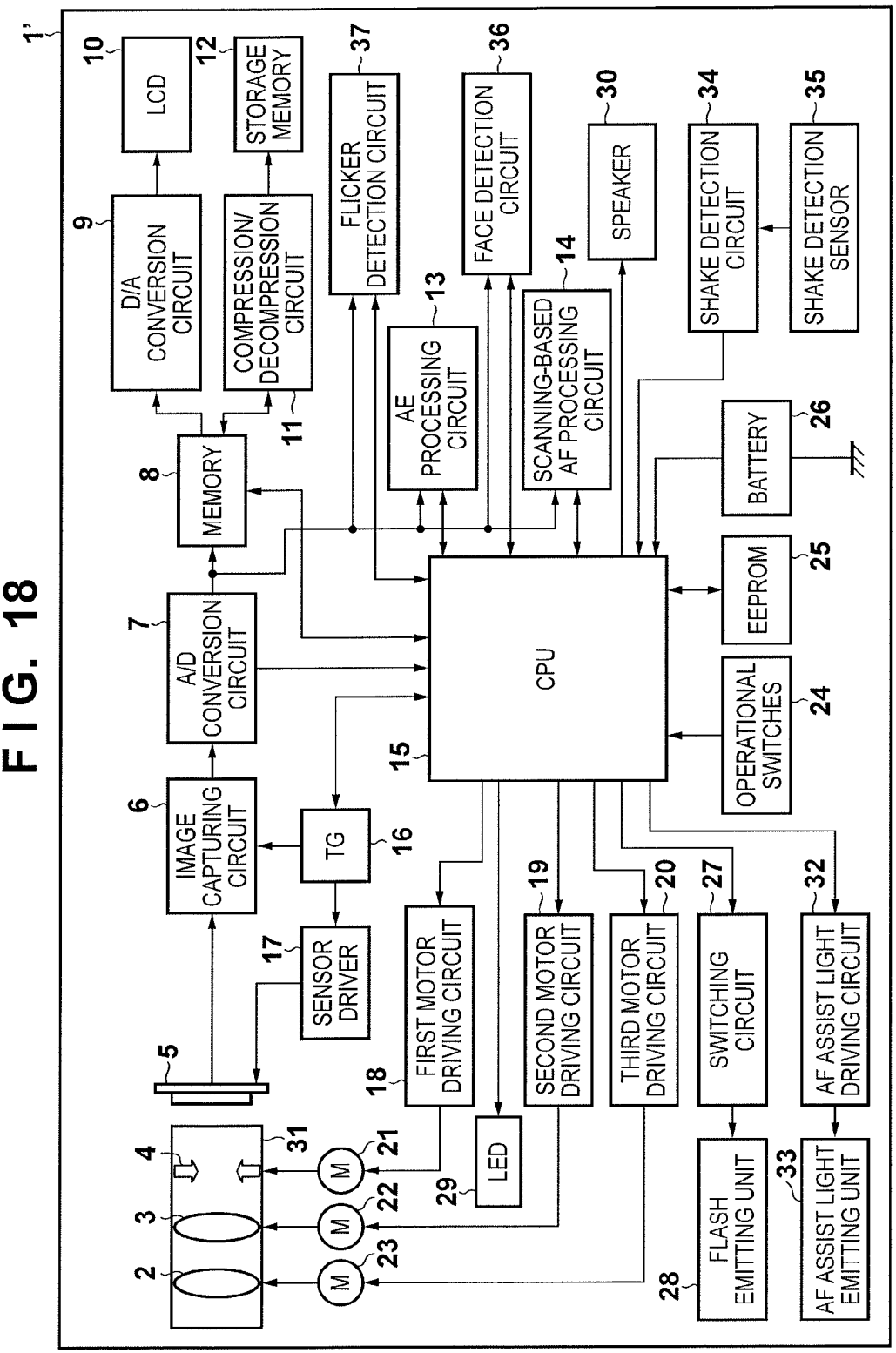
FIG. 18 is a block diagram illustrating a configuration of an image capturing apparatus according to a fourth embodiment.

FIG. 18 is a block diagram illustrating the overall configuration of an image capturing apparatus 1' according to the fourth embodiment. The configuration illustrated in FIG. 18 adds, to the configuration shown in FIG. 1, a flicker detection circuit 37 that receives an output from the A/D conversion circuit 7, detects whether or not flicker occurs based on luminance fluctuations in the screen, and detects the frequency of the detected flicker. The other elements are the same as those in the configuration shown in FIG. 1, and thus the same reference numerals will be assigned thereto and descriptions thereof will be omitted.

AE Processing

Figure 19:
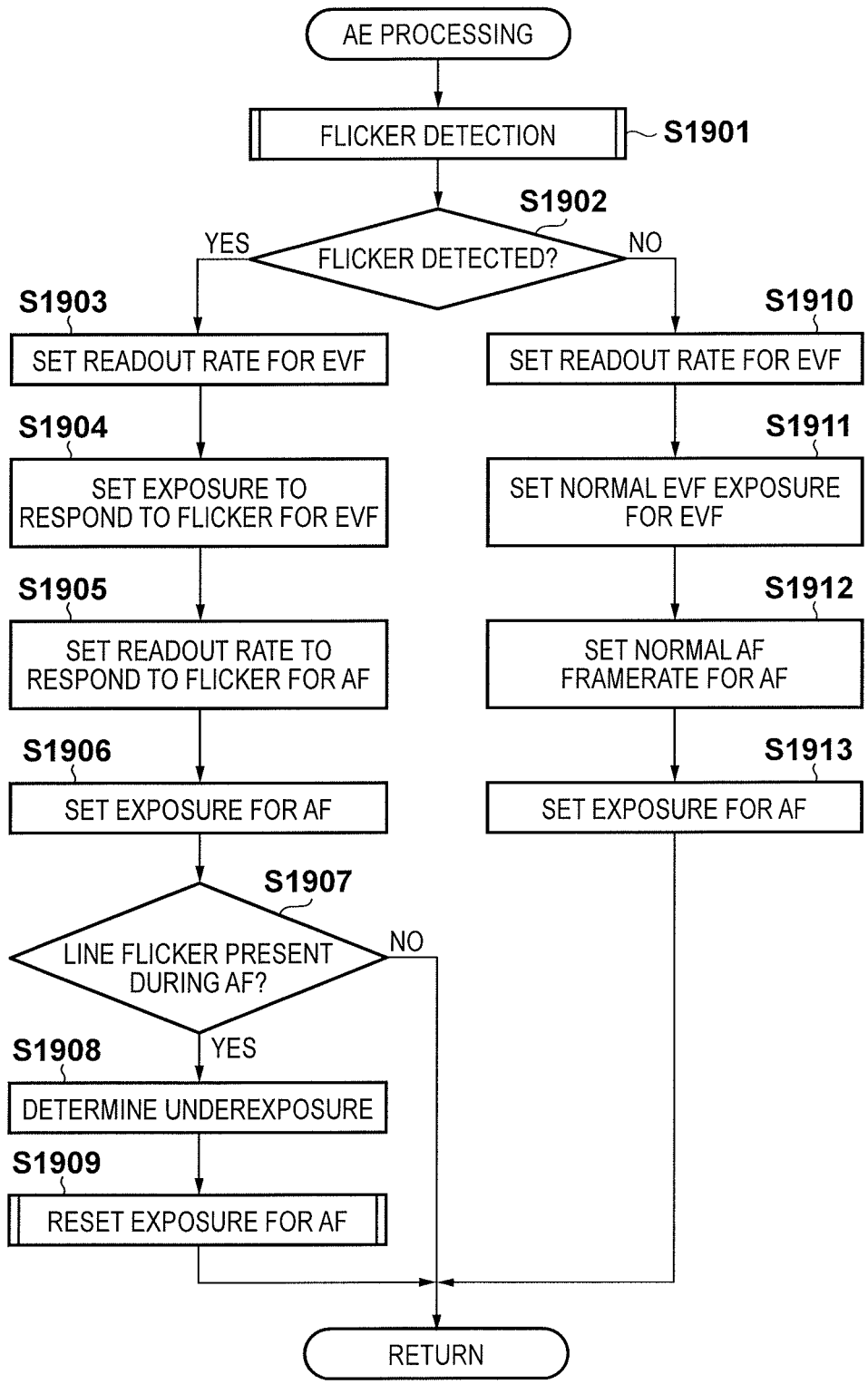
FIG. 19 is a flowchart illustrating AE processing according to the fourth embodiment.

FIG. 19 is a flowchart illustrating operations in the AE processing carried out in step S3 of FIG. 5 according to the fourth embodiment. In the fourth embodiment as well, different exposure conditions and different readout rates are set in the image sensor 5 for obtaining signal of the EVF image and for obtaining signal for carrying out the AF processing. Meanwhile, in the case where line flicker is influencing the AF signal, a range that is underexposed is determined for each line in the AF frame, and the exposure is reset taking into consideration the underexposed range.

In step S1901, the flicker detection circuit 37 detects flicker, after which the process advances to step S1902. Here, the flicker detection process can determine whether or not flicker has been detected and execute detection of the flicker frequency by employing any method used conventionally; such processing is not the original purpose of the present application, and thus details thereof will be omitted here.

In step S1902, it is determined whether or not flicker has been detected in step S1901, and the process advances to step S1903 in the case where flicker has been detected and advances to step S1910 in the case where flicker has not been detected. In step S1903, a predetermined value is set for the readout rate of the EVF signal, after which the process advances to step S1904.

In step S1904, the exposure is set for the EVF signal taking into consideration the exposure of the screen as a whole, so that an appropriate exposure is obtained. At this time, a charge accumulation period capable of suppressing the flicker is preferentially set, based on the frequency of the flicker. Here, in the case where flicker at a frequency of 50 Hz has been detected in the flicker detection performed in step S1901, the exposure is set so that an integral multiple of the flicker frequency, or in other words, 1/50 second or 1/100 second, is set preferentially. On the other hand, in the case where flicker at a frequency of 60 Hz has been detected in the flicker detection performed in step S1901, the exposure is set so that an integral multiple of the flicker frequency, or in other words, 1/60 second or 1/120 second, is set preferentially. Doing so makes it possible to suppress the appearance from worsening due to line flicker in the EVF display, even in the case where such flicker has been detected.

In step S1905, the readout rate is set for the AF signal based on the frequency of the flicker detected in the flicker detection performed in S1901. Here, in the case where flicker at a frequency of 50 Hz has been detected in the flicker detection performed in step S1901, the readout rate is set to 1/50 seconds or 1/100 seconds. On the other hand, in the case where flicker at a frequency of 60 Hz has been detected in the flicker detection performed in step S1901, the readout rate is set to 1/60 seconds or 1/120 seconds. By matching the readout rate to the flicker frequency, cyclical luminance fluctuations, which correspond to the influence of the flicker on each readout line, become constant with each readout, which makes it possible to prevent the line flicker.

In step S1906, the AF exposure is set taking into consideration the exposure of the overall range in which the AF frame is set. Here, unlike the exposure settings for display in the LCD 10, the appearance is of no concern, and thus the exposure is set with priority given to an open aperture and a low gain setting, which corresponds to the optimal exposure settings for maintaining the accuracy of the AF. Accordingly, depending on the value of the shutter speed, the influence of line flicker may remain.

In step S1907, it is determined whether or not the AF signal has been influenced by line flicker; in the case where the signal has been influenced by line flicker, the process advances to step S1908, whereas in the case where the signal has not been influenced by line flicker, the process ends. Here, the determination is carried out by comparing the frequency of the flicker detected in step S1901 with the value of the shutter speed set in step S1906. In the case where the frequency of the flicker and the charge accumulation period are not synchronous, for example, the exposure will differ from line to line, and the influence of the line flicker will remain. However, because a readout rate synchronous with the detected flicker has been set in step S1905, the manner in which the line flicker appears in each line is constant with each readout, and thus fluctuations in the line flicker do not occur.

Figure 20:
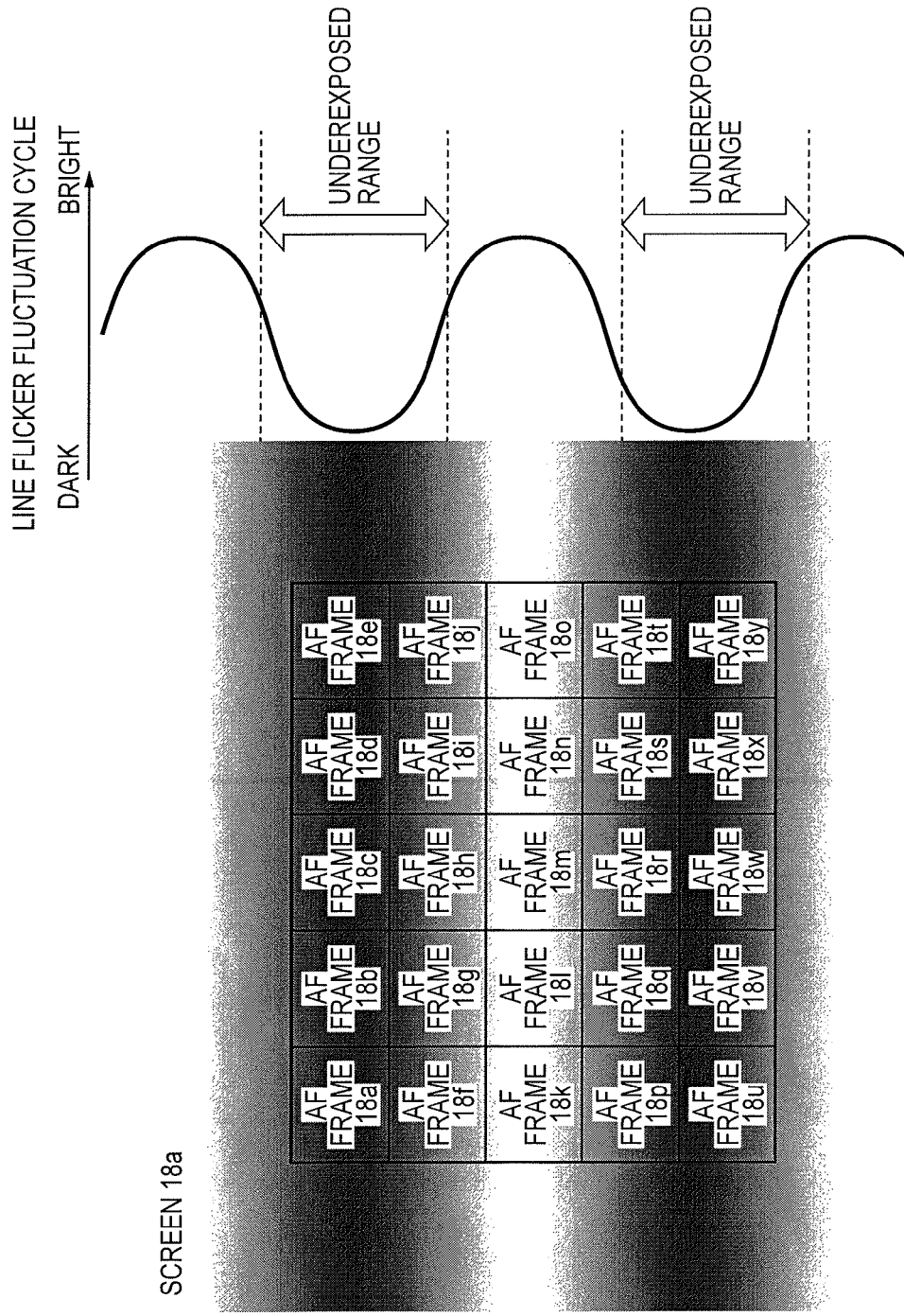
FIG. 20 is a diagram illustrating underexposure determination according to the fourth embodiment.

In step S1908, lines in the AF signal that are underexposed due to the influence of flicker are determined. FIG. 20 is a diagram illustrating the underexposure determination. In FIG. 20, a screen 18a indicates an AF signal image, in which 25 AF frames (AF frames 18a to 18y) are set. Here, a range in which the output drops by greater than or equal to a predetermined amount due to the fluctuation cycle of the flicker detected in step S1901 is set as an underexposed range, the flicker fluctuation cycle and the AF signal readout timing are associated, and a region of the AF signal in the underexposed range is specified. In the example shown in FIG. 20, ten AF frames, namely the AF frames 18a to 18e and the AF frames 18u to 18y, are within the underexposed range.

In step S1909, the AF exposure is reset taking into consideration the AF frames containing lines determined to be underexposed in step S1908, through processing that will be described later. Note that the processing carried out here will be described later with reference to FIG. 21.

Meanwhile, in the case where flicker has not been detected, in step S1910, a predetermined readout rate for obtaining the EVF signal is set, and the process advances to step S1911. In step S1911, the EVF exposure is set taking into consideration the exposure of the screen as a whole, after which the process advances to step S1912.

In step S1912, a predetermined readout rate for obtaining the AF signal is set, and the process advances to step S1913. In step S1913, the exposure is set taking into consideration the exposure in the overall range in which the AF frames are set, with priority given to an open aperture/a low gain setting for ensuring the accuracy of the AF in the same manner as in step S1906, after which the process ends.

Note that a situation where a readout rate corresponding to the flicker cannot be set in step S1905 may occur (a case where the readout rate is to be increased to give priority to speed, a case where the readout rate is to be reduced in order to extend the charge accumulation period in low-light scenes, or the like). In such a case, a drop in the signal output caused by flicker may be corrected by changing the charge accumulation period, a signal amplification amount, or the like on a line-by-line basis in correspondence with the frequency of the detected flicker.

Figure 21:
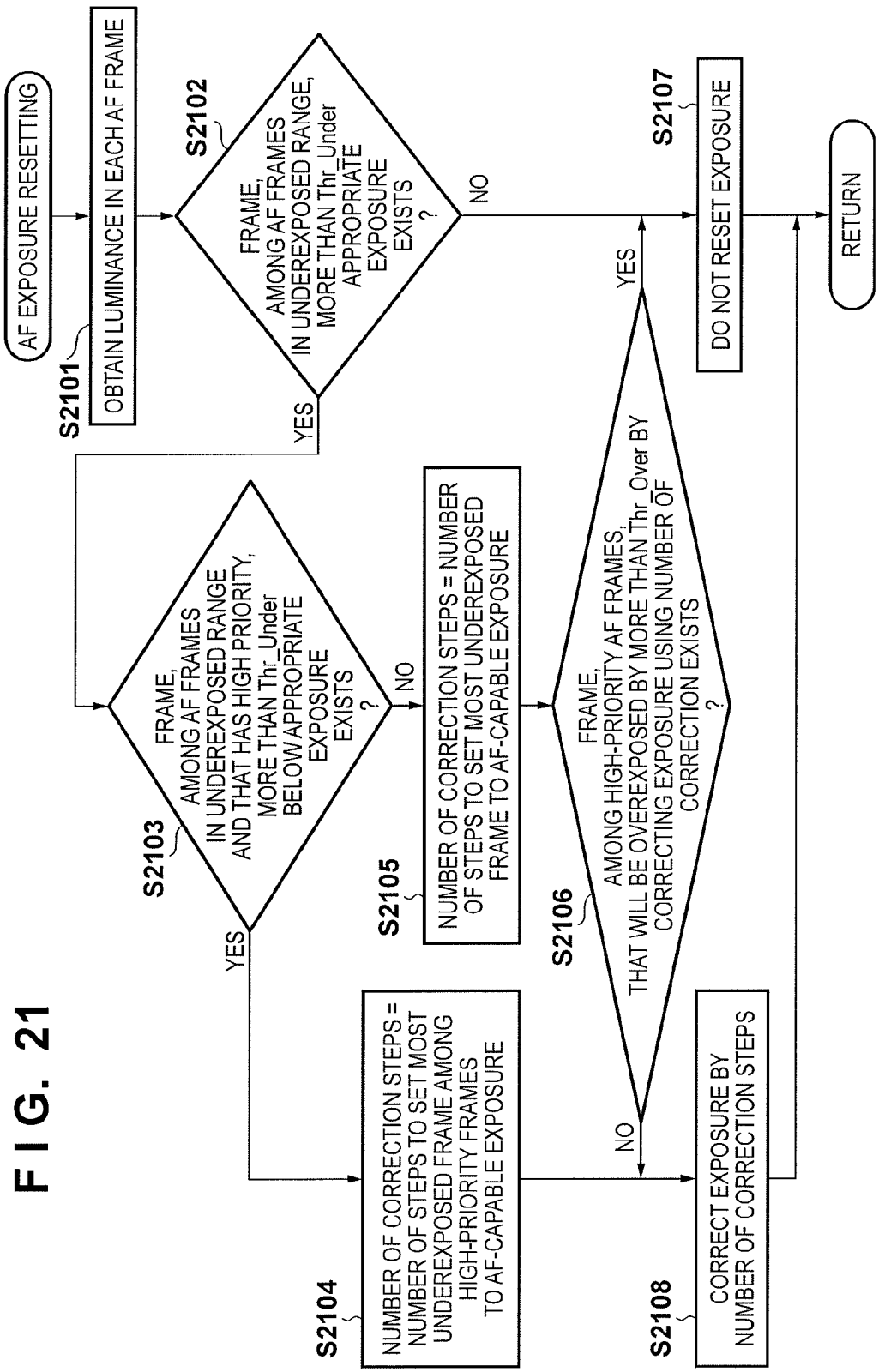
FIG. 21 is a flowchart illustrating exposure re-setting processing according to the fourth embodiment.

FIG. 21 is a flowchart illustrating the AF exposure resetting process carried out in step S1909 of FIG. 19. Here, an exposure range capable of ensuring the AF performance during the AF processing is set within a range no greater than a number of steps Thr_Over relative to the appropriate exposure and no less than a number of steps Thr_Under relative to the appropriate exposure. Thr_Over may be set to +1 and Thr_Under may be set to −1, for example.

In step S2101, luminance values are obtained for each AF frame set in the AF signal, a difference between the exposure in each AF frame and the appropriate exposure is calculated, and the process moves to step S2102. In step S2102, it is determined whether, of the AF frames determined to be present in the underexposed range based on the result of the underexposure determination performed in step S1908, an AF frame underexposed more than the number of steps Thr_Under below the appropriate exposure is present; in the case where such a frame is present, the process advances to step S2103, whereas in the case where such a frame is not present, the process advances to step S2107.

In step S2103, it is determined whether or not the AF frame underexposed more than Thr_Under is a high-priority AF frame; in the case where the AF frame is a high-priority AF frame, the process advances to step S2104, whereas in the case with AF frame is not a high-priority AF frame, the process advances to step S2105. Here, the "high-priority AF frame" is, for example, an AF frame that is near the center or the like and that is highly likely to contain an object, and the output result of the AF evaluation value from a high-priority AF frame is set in advance to be used preferentially when determining the in-focus position.

In step 32104, a number of steps for correcting the exposure is set using the most underexposed AF frame in the high-priority AF frames as a reference. The number of steps for correction is set to any number of steps at which the most underexposed AF frame takes on the exposure within the range from the appropriate exposure+Thr_Over to the appropriate exposure+Thr_Under, which is a range that ensures the AF performance.

In step S2105, a number of steps for correcting the exposure is set using the most underexposed AF frame in the AF frames within the underexposed range as a reference, after which the process advances to step S2106. In step S2106, it is determined whether or not there is an AF frame, among the high-priority AF frames, that is overexposed more than Thr_Over as a result of correcting the exposure by the number of steps for correction; in the case where such an AF frame is present, the process advances to step S2107, whereas in the case where such an AF frame is not present, the process advances to step S2108.

In step S2107, the exposure is not reset, whereas in step S2108, the exposure is corrected by the number of steps for correction set in step S2104 or in step S2105, after which the process ends.

According to the fourth embodiment as described thus far, when flicker is detected, a process that prioritizes the appearance is carried out for the EVF display signal, whereas exposure settings are carried out in order to ensure the AF accuracy for the AF signal. Through this, both the appearance of the EVF and accuracy of the AF can be ensured when flicker has been detected.

Fifth Embodiment

Next, a fifth embodiment of the present invention will be described. An image capturing apparatus according to the fifth embodiment has the same configuration as the image capturing apparatus 1' described in the fourth embodiment with reference to FIG. 18. The processing performed according to the fifth embodiment differs from that in the aforementioned fourth embodiment in that a process for detecting whether or not flicker occurs is carried out and, in the case where flicker occurs, a process for setting the AF frames is carried out based on the frequency of the flicker. Accordingly, only the processing for setting the AF frames involved in the AE processing will be described, and descriptions of other processes will be omitted.

Figure 22:
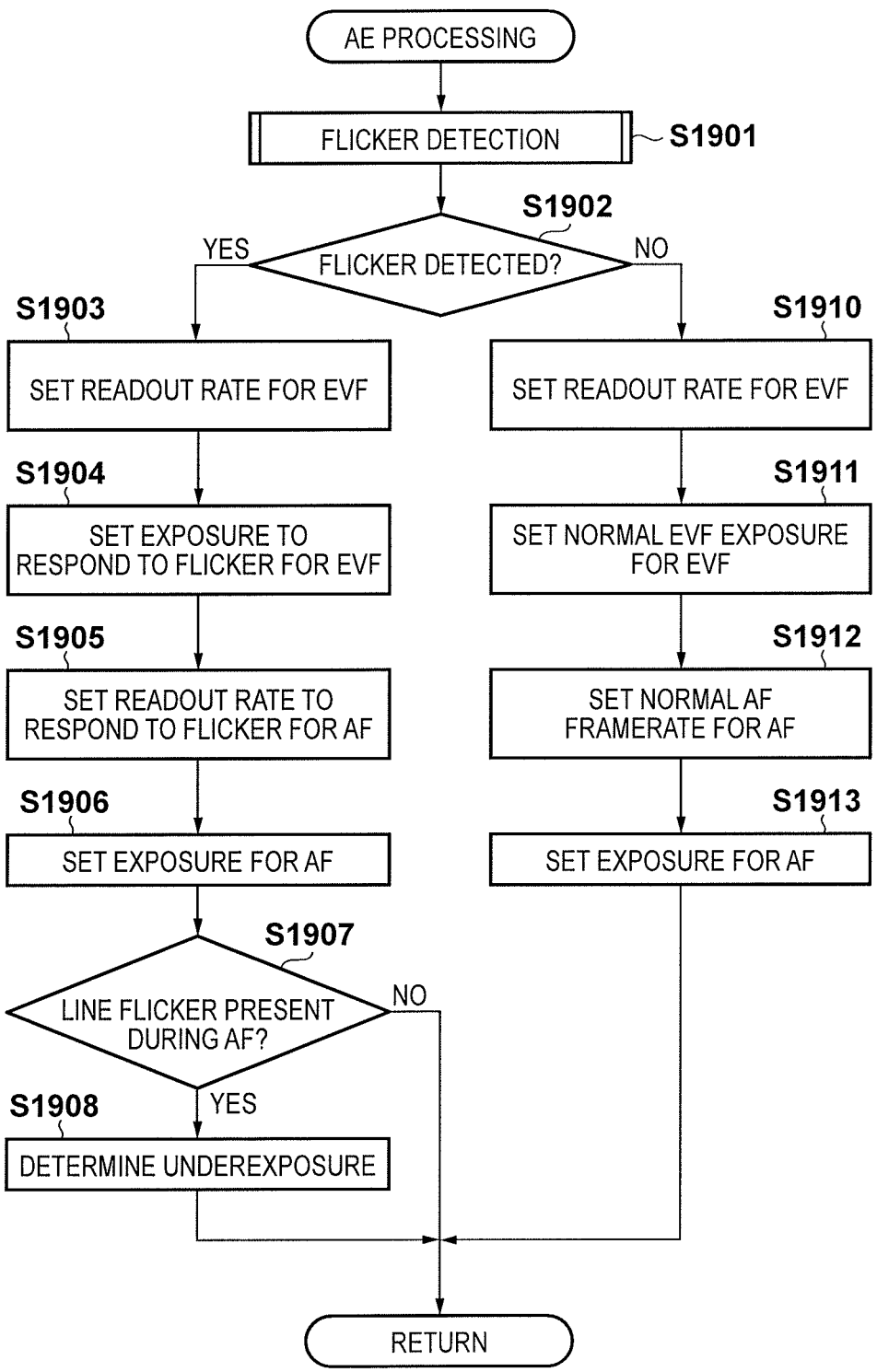
FIG. 22 is a flowchart illustrating operations in the AE processing shown in FIG. 5 according to a fifth embodiment.

FIG. 22 is a flowchart illustrating operations in the AE processing carried out in step S3 of FIG. 5 according to the fifth embodiment. This process differs from that shown in FIG. 19 in that the AF exposure re-setting processing of step S1909 is not carried out. The other processes are the same as the processes described with reference to FIG. 19, and therefore descriptions thereof will be omitted.

FIG. 23 is a flowchart illustrating the normal image AF processing carried out in step S605 or step S606 of FIG. 6. Here, the AF frames are set to a range in which the accuracy of the AF can be ensured, based on a result of the underexposure determination carried out in step S1908 in FIG. 22.

Figure 24:
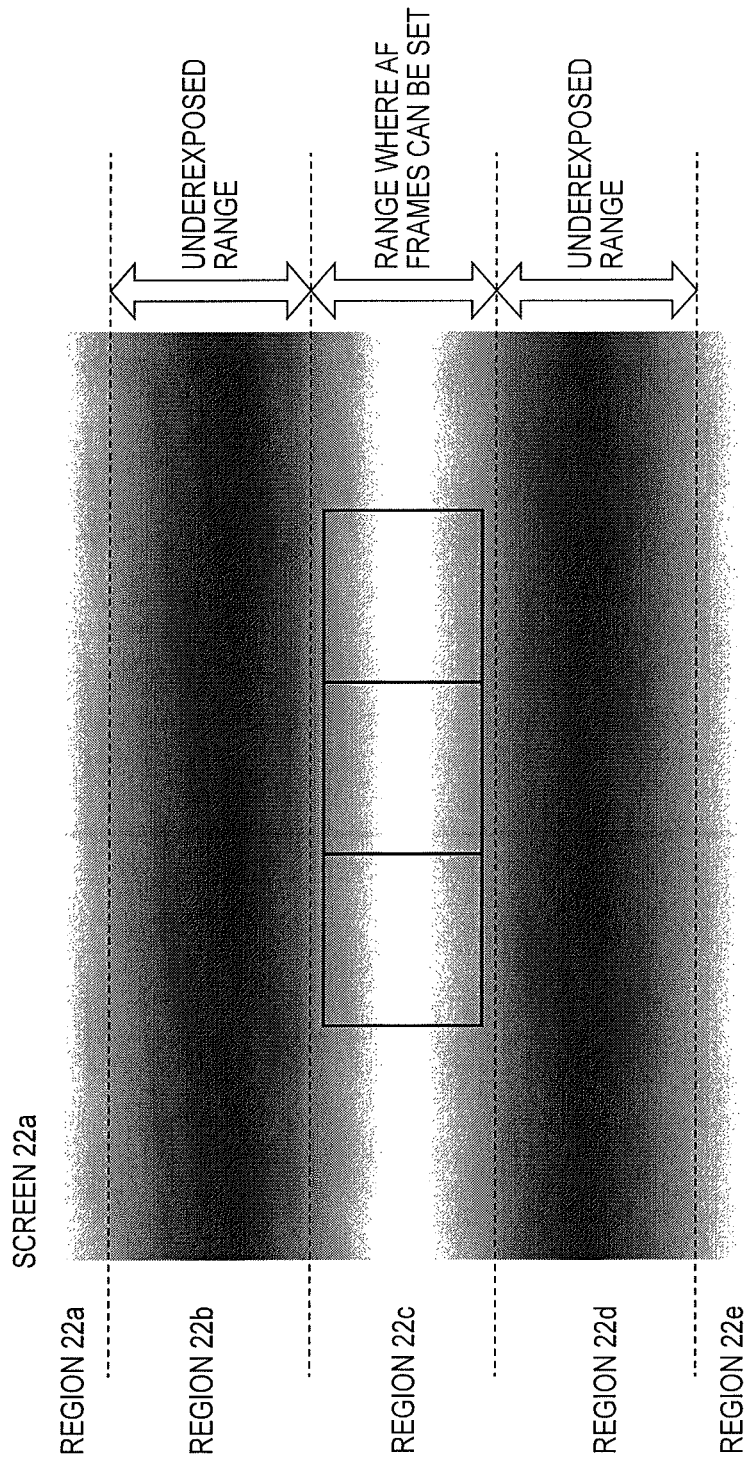
FIG. 24 is a diagram illustrating AF frame setting processing according to the fifth embodiment.

In step S2301, underexposed regions are obtained by referring to a result of the underexposure determination carried out in step S1908 of FIG. 22. In step S2302, the AF frames are set as shown in FIG. 24 so as to avoid the underexposed ranges obtained in step S2301. In FIG. 24, a screen 22a is divided into five regions, namely a region 22a to a region 22e, in accordance with the degree of underexposure. The regions 22b and 22d are in an underexposed range and may therefore be unable to ensure the accuracy of the AF, and as such, AF frames are not set therein; the AF frames are set within the region 22c, which of the regions 22a, 22c, and 22e that belong to ranges that are not underexposed, is located near the center of the screen. Doing so makes it possible to obtain the AF evaluation value from within a range that is not influenced by a drop in exposure caused by line flicker.

In step S2303, the scanning-based AF is carried out by driving the focus lens group 3 within a predetermined scanning range, the in-focus position is obtained for each AF frame set in step S2302, and the normal image AF processing ends.

Thus as described thus far, when flicker has been detected, a process that prioritizes the appearance is carried out for the EVF signal, and the AF frames are set within a range in which the accuracy of the AF can be ensured for the AF signal; as a result, both the appearance of the EVF and accuracy of the AF can be ensured even when flicker has been detected.

Sixth Embodiment

Next, a sixth embodiment of the present invention will be described. An image capturing apparatus according to the sixth embodiment has the same configuration as the image capturing apparatus 1' described in the fourth embodiment with reference to FIG. 18. The processing performed according to the sixth embodiment differs from that in the aforementioned fifth embodiment in that a process for detecting whether or not flicker occurs is carried out and, in the case where flicker occurs, a process for setting the reliability of the AF frames is carried out based on the frequency of the flicker. Accordingly, only the processing for setting the reliability of the AF frames involved in the AE processing will be described, and descriptions of other processes will be omitted.

In the sixth embodiment, a plurality of AF frames, including AF frames present in underexposed ranges, are set in a screen 23a shown in FIG. 25, and the reliability of the AF frames is set in accordance with the degree to which the underexposed range is contained, in step S2302 of FIG. 23. In FIG. 23, the reliability of an AF frame not present in an underexposed range is set to 1, the reliability of an AF frame partially present in an underexposed range is set to 2, and the reliability of an AF frame completely present in an underexposed range is set to 3. Then, when determining the lens driving position in step S608 of FIG. 6, the AF frames employed when determining the driving position are selected in order of priority from the reliability of 1, to 2, and to 3.

Thus as described thus far, a process that prioritizes the appearance can be carried out for the EVF display signal, whereas for the AF signal, an exposure setting optimal for AF can be made while also determining the in-focus position in a range that suppresses the influence of line flicker to the greatest extent possible.

Although the aforementioned first to sixth embodiments describe examples of a digital still camera having an integrated lens, the present invention can also be applied in the AF for digital video cameras, a live view for a digital signal-lens reflex camera, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-252415, filed on Dec. 5, 2013 which is hereby incorporated by reference herein in its entirety.

What is claimed is:

1. An image capturing apparatus comprising:
an image sensor, having a plurality of pixels arranged two-dimensionally, that photoelectrically converts an object image formed by an optical imaging system including a focus lens and output an electrical image signal;
a photometry unit; and
a processor that:
controls at least one of a readout rate and an exposure condition independently for each of a plurality of different regions of the image sensor,
calculates a plurality of focus evaluation values based on signals for autofocus processing read out from the pixels present in a first region of the plurality of different regions at a plurality of different focus lens positions while moving the focus lens, and finds an in-focus position of the focus lens based on the plurality of focus evaluation values,
controls to read out image signals for display to be output to a display unit from a second region that is different from the first region among the plurality of different regions,
judges whether or not a point light source object is present in the first region,
controls at least one of the readout rate and the exposure condition of the second region based on a photometry result of the photometry unit, and in the case where it has been judged that a point light source object is present, controls at least one of the readout rate and the exposure condition so that the first region is underexposed relative to the second region, and
calculates a plurality of focus evaluation values based on image signals read out from the first region and finds the in-focus position of the focus lens based on the plurality of focus evaluation values.

2. An image capturing apparatus comprising:
an image sensor, having a plurality of pixels arranged two-dimensionally, that photoelectrically converts an object image formed by an optical imaging system including a focus lens and output an electrical image signal;
a photometry unit; and
a processor that:
controls at least one of a readout rate and an exposure condition independently for each of a plurality of different regions of the image sensor,
calculates a plurality of focus evaluation values based on signals for autofocus processing read out from the pixels present in a first region of the plurality of different regions at a plurality of different focus lens positions while moving the focus lens, and finds an in-focus position of the focus lens based on the plurality of focus evaluation values,
controls to read out image signals for display to be output to a display unit from a second region that is different from the first region among the plurality of different regions,
judges whether or not a point light source object is present in the first region,
controls at least one of the readout rate and the exposure condition of the second region based on a photometry result of the photometry unit, and in the case where a plurality of focus detection areas have been set and it has been judged that a point light source object is present in each of the plurality of focus detection areas, controls at least one of the readout rate and the exposure condition so that the first region is underexposed relative to the second region, and
calculates a plurality of focus evaluation values based on image signals read out from the first region and finds the in-focus position of the focus lens based on the plurality of focus evaluation values.

3. The image capturing apparatus according to claim 2, wherein in the case where it has been judged that a point light source object is present in each of the plurality of focus detection areas and a reliability of each of the focus evaluation values calculated by the processor is lower than a predetermined reliability, the processor calculates the focus evaluation value based on the image signals output from the second region contained in the plurality of focus detection areas.

4. The image capturing apparatus according to claim 2, further comprising:
an instruction unit that instructs image capturing preparation,
wherein the processor further:
calculates focus evaluation values based on the image signals output from the pixels included in the focus detection area of the image sensor at a predetermined cycle and moves the focus lens so that the focus evaluation value increases, before the image capturing preparation is instructed; and calculates the plurality of focus evaluation values at a plurality of different focus lens position while moving the focus lens, after the image capturing preparation is instructed.

5. The image capturing apparatus according to claim 1, wherein the exposure condition is a charge accumulation period.

6. A control method for an image capturing apparatus including an image sensor, having a plurality of pixels arranged two-dimensionally, configured to photoelectrically convert an object image formed by an optical imaging system including a focus lens and output an electrical image signal, and a photometry unit, the method comprising:

controlling at least one of a readout rate and an exposure condition independently for each of a plurality of different regions of the image sensor;

calculating a plurality of focus evaluation values based on image signals for autofocus processing output from the pixels present in a first region of the plurality of different regions at a plurality of different focus lens positions while moving the focus lens, and finding an in-focus position of the focus lens based on the plurality of focus evaluation values;

controlling to read out image signals for display to be output to a display unit from a second region that is different from the first region among the plurality of different regions;

judging whether or not a point light source object is present in the first region;

controlling at least one of the readout rate and the exposure condition of the second region based on a photometry result of the photometry unit, and in the case where it has been judged that a point light source object is present, controlling at least one of the readout rate and the exposure condition so that the first region is underexposed relative to the second region; and calculating a plurality of focus evaluation values based on image signals read out from the first region and finds the in-focus position of the focus lens based on the plurality of focus evaluation values.

7. A control method for an image capturing apparatus including an image sensor, having a plurality of pixels arranged two-dimensionally, configured to photoelectrically convert an object image formed by an optical imaging system including a focus lens and output an electrical image signal, and a photometry unit, the method comprising:

controlling at least one of a readout rate and an exposure condition independently for each of a plurality of different regions of the image sensor;

calculating a plurality of focus evaluation values based on image signals for autofocus processing output from the pixels present in a first region of the plurality of different regions at a plurality of different focus lens positions while moving the focus lens, and finding an in-focus position of the focus lens based on the plurality of focus evaluation values;

controlling to read out image signals for display to be output to a display unit from a second region that is different from the first region among the plurality of different regions;

judging whether or not a point light source object is present in the first region;

controlling at least one of the readout rate and the exposure condition of the second region based on a photometry result of the photometry unit, and in the case where a plurality of focus detection areas have been set and it has been judged that a point light source object is present in each of the plurality of focus detection areas, controlling at least one of the readout rate and the exposure condition so that the first region is underexposed relative to the second region; and calculating a plurality of focus evaluation values based on image signals read out from the first region and finds the in-focus position of the focus lens based on the plurality of focus evaluation values.

8. The image capturing apparatus according to claim 2, wherein the exposure condition is a charge accumulation period.

* * * * *